United States Patent
Wentink et al.

(10) Patent No.: US 9,936,492 B2
(45) Date of Patent: Apr. 3, 2018

(54) METHODS AND SYSTEMS FOR MULTI USER UPLINK COMPATIBILITY WITH LEGACY DEVICES

(71) Applicant: QUALCOMM Incorporated, San Diego, CA (US)

(72) Inventors: Maarten Menzo Wentink, Naarden (NL); Simone Merlin, San Diego, CA (US); Albert Van Zelst, Woerden, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/795,833

(22) Filed: Jul. 9, 2015

(65) Prior Publication Data
US 2016/0014729 A1 Jan. 14, 2016

Related U.S. Application Data

(60) Provisional application No. 62/023,740, filed on Jul. 11, 2014, provisional application No. 62/025,239, (Continued)

(51) Int. Cl.
| | |
|---|---|
| *H04W 4/00* | (2009.01) |
| *H04W 72/04* | (2009.01) |
| *H04L 29/08* | (2006.01) |
| *H04L 1/00* | (2006.01) |
| *H04W 28/22* | (2009.01) |
| *H04W 72/12* | (2009.01) |
| *H04W 84/12* | (2009.01) |

(52) U.S. Cl.
CPC .......... *H04W 72/042* (2013.01); *H04L 1/007* (2013.01); *H04L 69/323* (2013.01); *H04W 28/22* (2013.01); *H04W 72/048* (2013.01); *H04W 72/1268* (2013.01); *H04W 72/1289* (2013.01); *H04W 84/12* (2013.01)

(58) Field of Classification Search
CPC .................................................. H04W 72/042
USPC .......................................................... 370/329
See application file for complete search history.

(56) References Cited

U.S. PATENT DOCUMENTS

| | | | |
|---|---|---|---|
| 2007/0116035 A1* | 5/2007 | Shao | H04W 74/08 370/461 |
| 2007/0160040 A1* | 7/2007 | Kwon | H04L 47/10 370/389 |

(Continued)

OTHER PUBLICATIONS

International Search Report and Written Opinion—PCT/US2015/040051—ISA/EPO—dated Sep. 22, 2015.
"IEEE Std 802.11-2012; Part 11: Wireless LAN Medium Access Control (MAC) and Physical Layer (PHY) Specifications;", IEEE Computer Society, New York, USA, Mar. 29, 2012 (Mar. 29, 2012), pp. 417-424, XP002744329.
Perahia E., et al., "Next Generation Wireless LANs (passage)", 2013, Cambridge University Press, XP002744328, vol. 2, p. 62-p. 63, p. 68-p. 69, p. 80-p. 85, p. 222, p. 244, p. 271-p. 272.

(Continued)

*Primary Examiner* — Christopher R Crompton
(74) *Attorney, Agent, or Firm* — Knobbe, Martens, Olson & Bear LLP

(57) ABSTRACT

Methods and apparatus for multiple user uplink are provided. In one aspect, a method of transmitting a physical layer convergence protocol data unit on a wireless medium includes generating a first portion and a second portion of the physical layer convergence protocol data unit, transmitting the first portion at a first data rate, the first portion decodable by a first and second sets of devices, and transmitting the second portion at a second data rate higher than the first data rate, the second portion decodable by the second set of devices.

17 Claims, 17 Drawing Sheets

Related U.S. Application Data filed on Jul. 16, 2014, provisional application No. 62/025,945, filed on Jul. 17, 2014.

(56) References Cited

U.S. PATENT DOCUMENTS

| | | | | |
|---|---|---|---|---|
| 2008/0316981 | A1* | 12/2008 | Trainin | H04L 5/1453 370/338 |
| 2010/0220601 | A1* | 9/2010 | Vermani | H04L 1/0025 370/248 |
| 2011/0222486 | A1* | 9/2011 | Hart | H04L 5/001 370/329 |
| 2015/0071211 | A1* | 3/2015 | Seok | H04W 74/04 370/329 |
| 2016/0081010 | A1* | 3/2016 | Seok | H04W 74/0816 370/329 |
| 2017/0310386 | A1* | 10/2017 | Liu | H04W 74/006 |

OTHER PUBLICATIONS

Sun W., et al., "IEEE 802.11ah: A Long Range 802. 11WLAN at Sub 1 GHz", Jul. 1, 2013 (Jul. 1, 2013), 25 Pages, XP055155803, DOI: 10.13052/jicts2245-800X .125 Retrieved from the Internet: URL: http://riverpublishers.com/journaldownload. php?file=RP_Journal_2245-800X_115.pdf [retrieved on Nov. 28, 2014].

Wan P.C., et al., "Enhancement of IEEE 802.11ah MAC for M2M Communications", IEEE Communications Letters, IEEE Service Center, Piscataway, NJ, US, vol. 18, No. 7, Jul. 1, 2014 (Jul. 1, 2014), pp. 1151-1154, XP011553042, ISSN: 1089-7798 , DOI: 10.1109/LCOMM.2014.2323311 [retrieved on Jul. 8, 2014].

Zhou Y., et al., "Advances in IEEE 802.11ah Standardization for Machine-Type Communications in Sub-1GHz WLAN", 2013 IEEE International Conference on Communications Workshops (ICC), IEEE, Jun. 9, 2013, pp. 1269-1273, XP032518475.

\* cited by examiner

METHODS AND SYSTEMS FOR MULTI USER UPLINK COMPATIBILITY WITH LEGACY DEVICES

CROSS-REFERENCE TO RELATED APPLICATIONS

This application claim priority under 35 U.S.C. § 119(e) to U.S. Provisional Application No. 62/023,740, filed Jul. 11, 2014, and entitled "METHODS AND SYSTEMS FOR MULTI USER UPLINK COMPATIBILITY WITH LEGACY DEVICES," and to U.S. Provisional Application No. 62/025,239, filed Jul. 16, 2014, and entitled "METHODS AND SYSTEMS FOR MULTI USER UPLINK COMPATIBILITY WITH LEGACY DEVICES," and to U.S. Provisional Application No. 62/025,945, filed Jul. 17, 2014, and entitled "METHODS AND SYSTEMS FOR MULTI USER UPLINK COMPATIBILITY WITH LEGACY DEVICES." The disclosures of each of these prior applications are considered part of this application, and are hereby each incorporated by reference in their entirety.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions.

Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect disclosed is a method of transmitting a physical layer convergence protocol data unit on a wireless medium. The method includes generating a first portion and a second portion of the physical layer convergence protocol data unit, transmitting the first portion at a first data rate, the first portion decodable by a first and second sets of devices; and transmitting the second portion at a second data rate higher than the first data rate, the second portion decodable by the second set of devices. In some aspects, the generating the second portion includes generating an indication of scheduling information for a multi-user transmission. In some aspects, the generating the second portion includes generating an identification of one or more of the second set of devices that will communicate during the multi-user transmission. In some aspects, the generating the identification of the one or more of the second set of devices includes generating at least one of a station identifier, group identifier, and association identifier for each of the one or more second set of devices.

In some aspects, the generating the second portion includes generating an indication of one or more of a modulation and coding scheme (MCS), bandwidth, subband, spatial stream information, and length information for the multi-user transmission. In some aspects, the generating the first portion includes generating a duration field, the duration field including a data value greater than a combined length of the first and second portions.

In some aspects, the generating the second portion includes generating an indication of a length of the second portion. In some aspects, the generating the first portion includes generating a signal field for indicating an end position of the second portion.

Another aspect disclosed is an apparatus for transmitting a physical layer convergence protocol data unit on a wireless medium. In some aspects, the apparatus includes a processor configured to generate first and second portions of the physical layer convergence protocol data unit, a transmitter configured to transmit the first portion at a first data rate, the first portion decodable by a first and second sets of devices; and transmit the second portion at a second data rate higher than the first data rate, the second portion decodable by the second set of devices. In some aspects, the generation of the second portion includes generating an indication of scheduling information for a multi-user transmission. In some aspects, the generation of the second portion includes generating an identification of one or more of the second set of devices that will communicate during the multi-user transmission. In some aspects, the generation of the identification of the one or more of the second set of devices includes generating at least one of a station identifier, group identifier, and association identifier for each of the one or more second set of devices.

In some aspects, the generation of the second portion includes generating an indication of one or more of a modulation and coding scheme (MCS), bandwidth, subband, spatial stream information, and length information for the multi-user transmission. In some aspects, the generation of the first portion includes generating a duration field storing a value greater than a combined length of the first and second portions. In some aspects, the generation of the second portion includes generating an indication of a length of the second portion. In some aspects, the generation of the first portion includes generating a signal field indicating an end position of the second portion.

Another aspect disclosed is a method of receiving a physical layer convergence protocol data unit on a wireless medium. The method includes receiving, by a wireless device, a first portion of the physical layer convergence protocol data unit, determining, based on the first portion, whether the physical layer convergence protocol data unit includes a second portion transmitted at a higher data rate than the first portion; and receiving the second portion at the higher data rate based on the determining.

In some aspects, the method also includes decoding the second portion for determining scheduling information for a multi-user transmission. In some aspects, the method also includes decoding the second portion for identifying one or more of the second set of devices that will communicate during the multi-user transmission, determining if the wireless device is identified, and communicating during the multi-user transmission based on whether the wireless device is identified.

In some aspects, the method includes identifying the one or more of the second set of devices by decoding one of a station identifier, group identifier, and association identifier for each of the one or more second set of devices from the second portion. In some aspects, the method includes decoding the second portion for determining one or more parameters of the multi-user transmission including one or more of a modulation and coding scheme (MCS), bandwidth, subband, spatial stream information, and length information for the multi-user transmission; and performing the multi-user transmission based on the determined one or more parameters.

In some aspects, the method includes decoding the first portion for determining a duration field having a data value greater than a combined length of the first and second portions; and setting a network allocation vector based on the data value of the duration field. In some aspects, the method also includes decoding an indication of a length of the second portion included in the second portion for determining the length of the second portion; and decoding the second portion based on the determined length.

In some aspects, the method also includes decoding a signal field in the first portion for determining an end position of the second portion; and decoding the second portion based on the determined end position.

Another aspect disclosed is an apparatus for receiving a physical layer convergence protocol data unit on a wireless medium. The apparatus includes a receiver configured to receive a first portion of the physical layer convergence protocol data unit; and a processor configured to determine, based on the first portion, whether the physical layer convergence protocol data unit includes a second portion transmitted at a higher data rate than the first portion, wherein the receiver is further configured to receive the second portion at the higher data rate based on the determining.

In some aspects of the apparatus, the processor is further configured to: decode the second portion for determining scheduling information for a multi-user transmission. In some aspects, the processor is further configured to decode the second portion for identifying one or more devices that will communicate during the multi-user transmission, determine if the apparatus is identified; and communicate during the multi-user transmission based on whether the apparatus is identified.

In some aspects of the apparatus, the processor is further configured to identify the one or more of devices by decoding one of a station identifier, group identifier, and association identifier for each of the one or more second set of devices from the second portion. In some aspects of the apparatus, the processor is further configured to decode the second portion for determining one or more parameters of the multi-user communication including a modulation and coding scheme (MCS), bandwidth, sub-band, spatial stream information, and length information for the multi-user transmission, and perform the multi-user transmission based on the determined parameters.

In some aspects of the apparatus, the processor is further configured to decode the first portion for determining a duration field having a data value greater than a combined length of the first and second portions; and set a network allocation vector based on the determined data value of the duration field.

DETAILED DESCRIPTION

Figure 1:
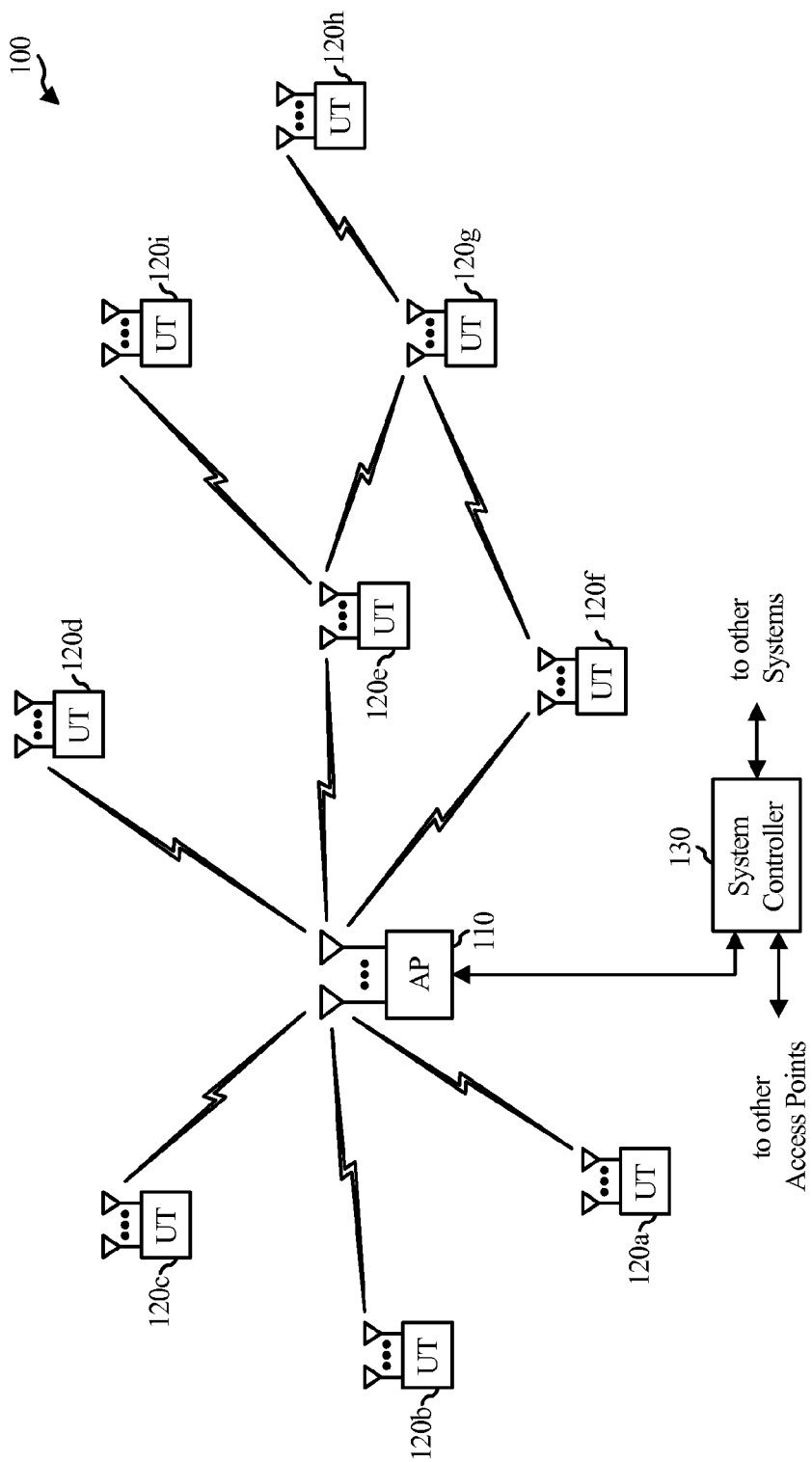
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
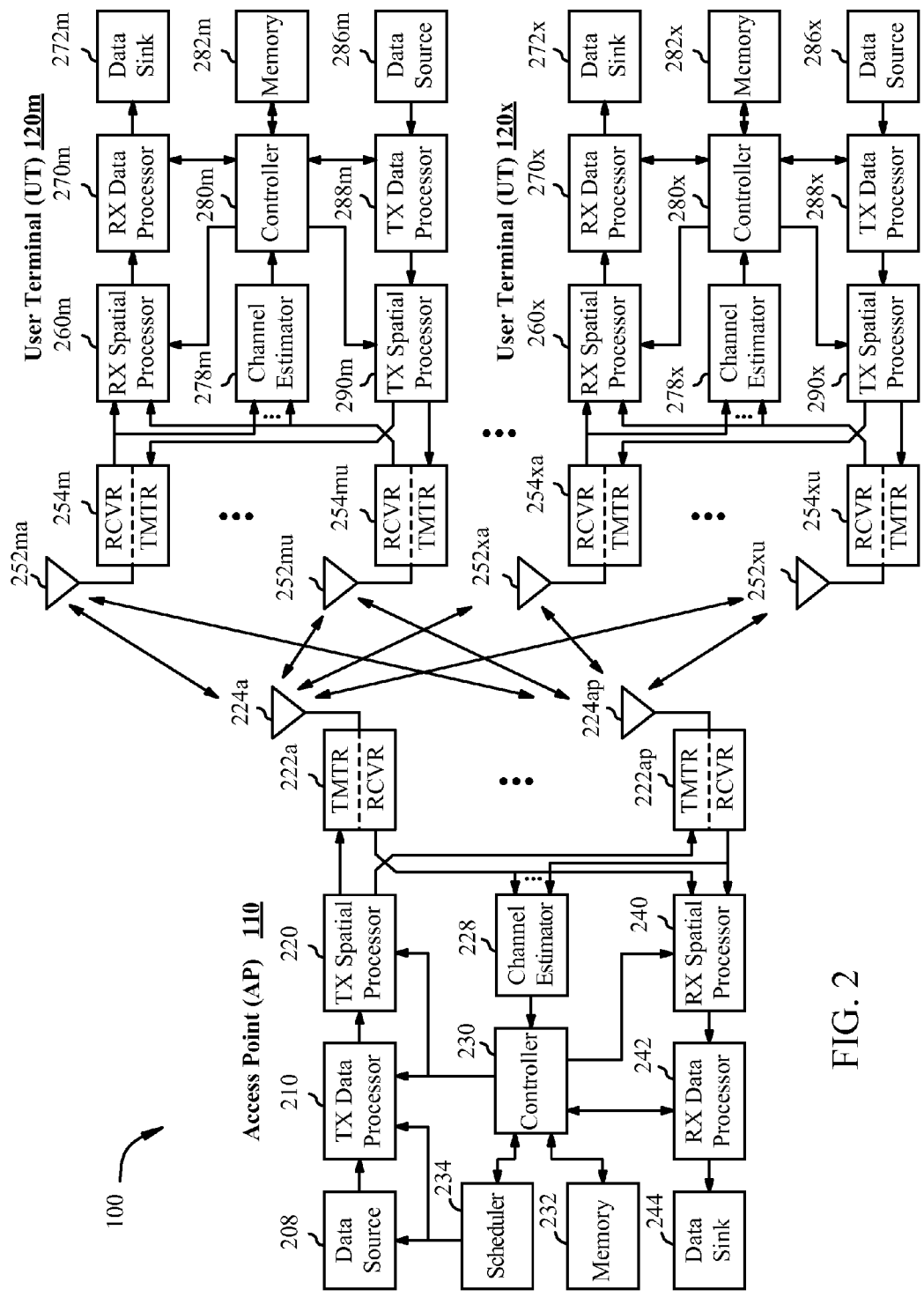
FIG. 2 illustrates a block diagram of the access point 110 and two user terminals 120m and 120x in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{xu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
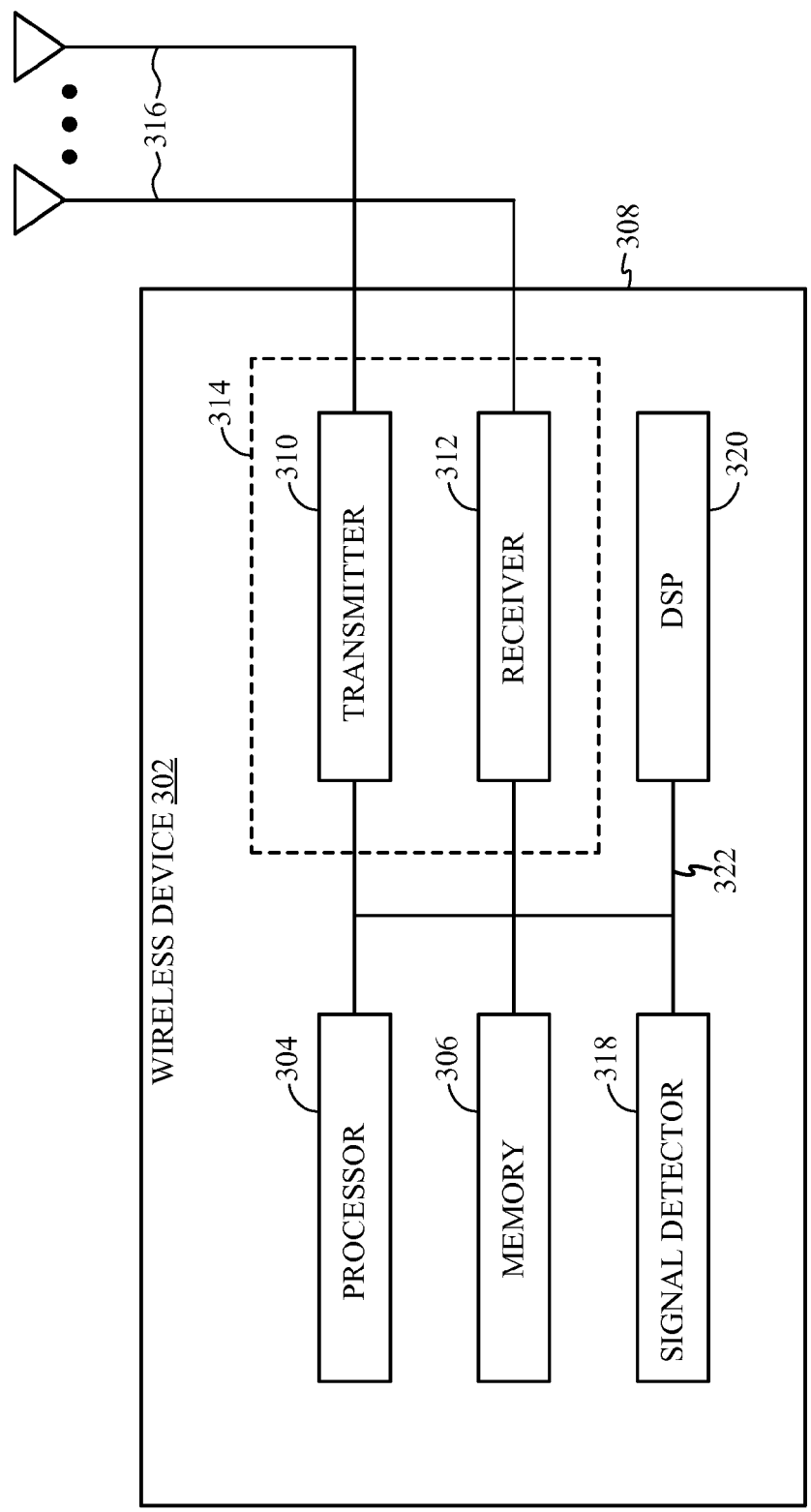
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple STAs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. In some embodiments, UL-MU-MIMO or UL-FDMA transmissions can be sent simultaneously from multiple STAs to an AP and may create efficiencies in wireless communication.

Figure 4:
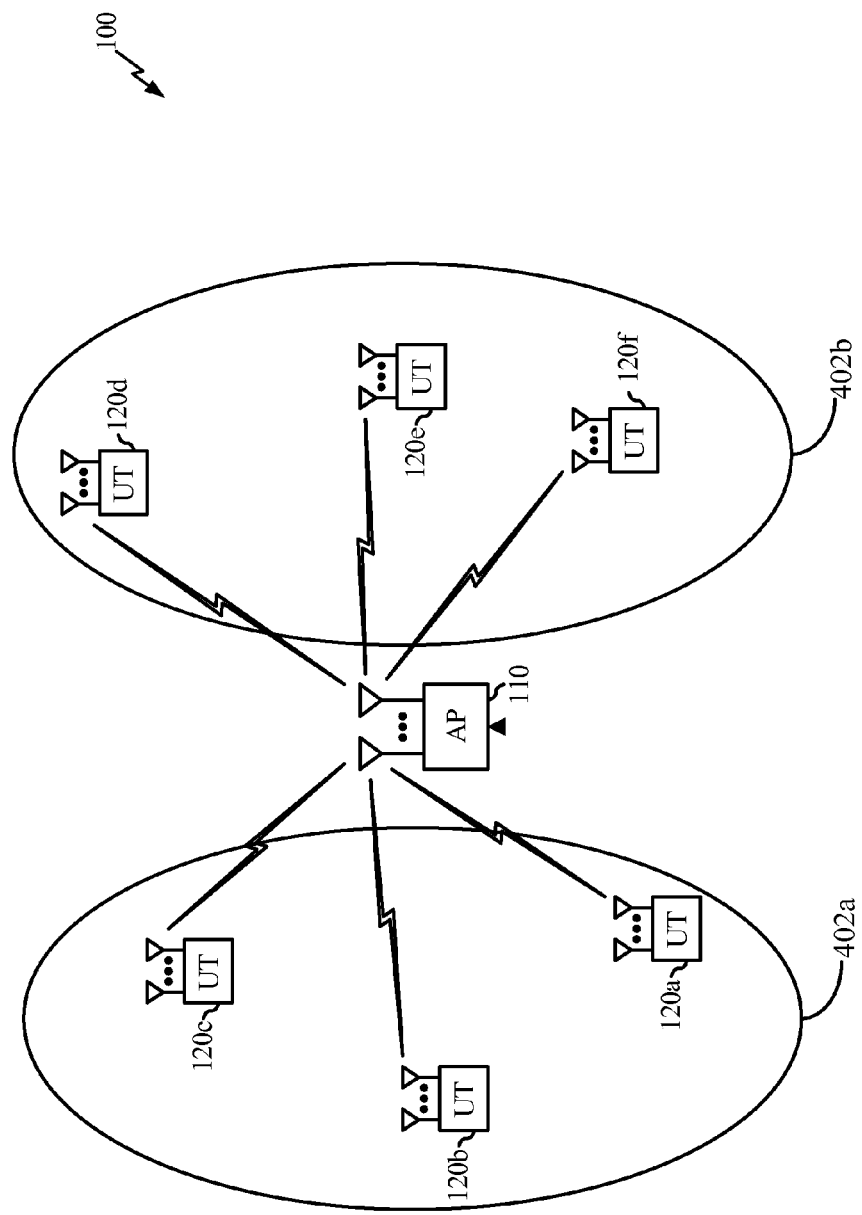
FIG. 4 is a diagram that illustrates a multiple-access multiple-input multiple-output (MIMO) system 100 with access points and user terminals.

FIG. 4 is a diagram that illustrates a multiple-access multiple-input multiple-output (MIMO) system 100 with access points and user terminals. The access point 110 in FIG. 4 is shown communicating with two groups of devices 402a-b. The first group of devices 402a includes at least user terminals 120a-c. The second group of devices 402b includes at least user terminals 120d-f. In some aspects, user terminals 120a-c may have a first set of features or capabilities, while user terminals 120d-f may have a second set of capabilities or features. For example, user terminals 120*a-c* may have been manufactured before a particular date, and thus their features or capabilities reflect technical standards and or features present at their time of manufacture. In contrast, user terminals 120*d-f* may have been manufactured after the particular date, and thus their features or capabilities include implementation of technical standards and/or features that post-date the particular date. Alternatively, user terminals 120*a-c* may be less sophisticated and thus less expensive devices than user terminals 120*d-f*. Due to less expensive design, user terminals 120*a-c* may be able to provide fewer features and/or capabilities than user terminals 120*d-f*.

As discussed above, certain aspects of the present disclosure support transmitting an uplink (UL) signal from multiple STAs to an access point. Older, legacy devices may not implement multi-user uplink transmissions. Therefore, network messages implementing multi-user uplink transmissions that were defined after the older legacy devices were produced, may not be readily interpreted or decoded by these legacy devices. However, it is still desirable to have these legacy devices refrain from transmissions during a non-contention period associated with multi-user uplink (UL) transmissions. One way to accomplish this would be to transmit two separate PPDUs, with a first PPDU indicating to legacy devices that they should refrain from transmission during a contention free period. A second, separate transmission of a PPDU could then be performed to communicate parameters of a multi-user transmission to select devices that have multi-user uplink capabilities. However, the transmission of two separate messages for the two sets of devices presents inefficiencies in network operation that are undesirable. Thus, methods and systems that communicate contention free periods to all devices, including legacy devices, in an efficient manner are desired, even when the contention free period will be used for multi-user uplink transmissions.

Additionally, devices that are capable of performing multi-user transmissions may also possess additional capabilities beyond those of legacy devices. For example, some of these devices may be capable of transmitting and/or receiving data at higher data rates than legacy devices. Therefore, it is desirable to take advantage of higher transmission and/or receive data rates present in modern devices to improve network throughput.

Figure 5A:
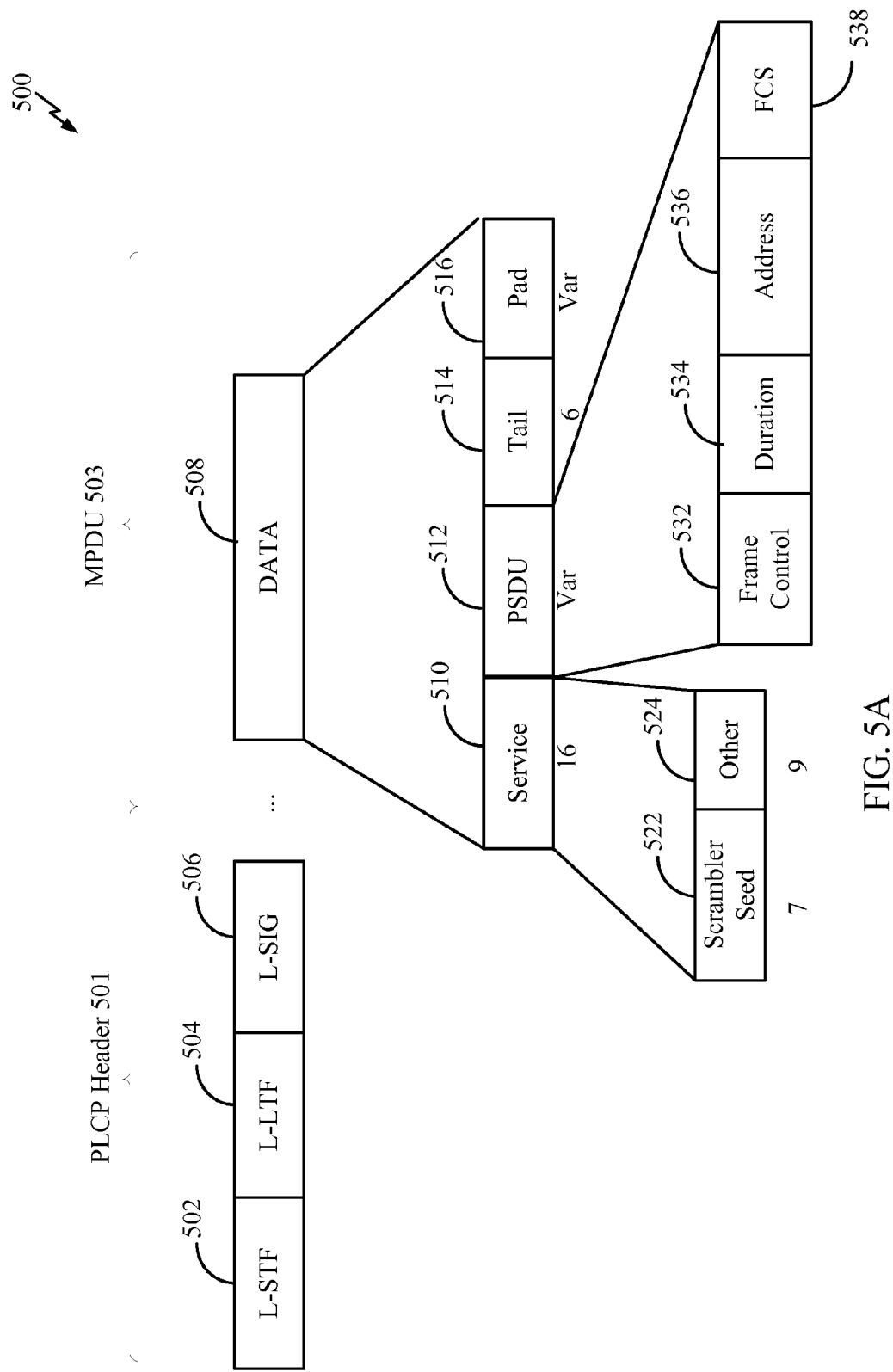
FIG. 5A illustrates an exemplary clear to send frame.

FIG. 5A illustrates an exemplary clear to send frame. The clear to send frame 500 includes a physical layer convergence protocol (PLCP) header 501 and a Media Access Control Protocol Data Unit (MPDU) 503. The PLCP header 501 includes at least a short training field 502, a long training field 504, and a signal field 506. The Media Access Control Protocol Data Unit (MPDU) 503 includes a data portion 508, that includes a service field 510, a physical layer service data unit 512, a tail field 514, and a pad field 516. The service field 510 includes a scrambler seed field 522 and other fields 524. The physical layer service data unit field 512 includes a frame control field 532, duration field 534, address field 536, and a frame check sequence field 538.

Figure 5B:
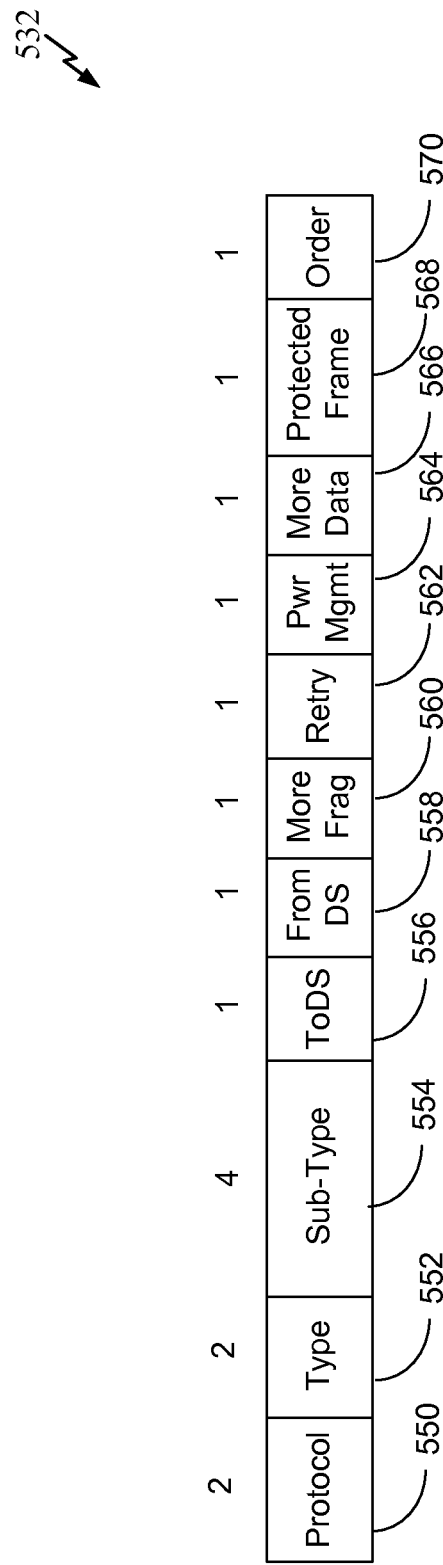
FIG. 5B illustrates an exemplary frame control field.
Figure 6A:
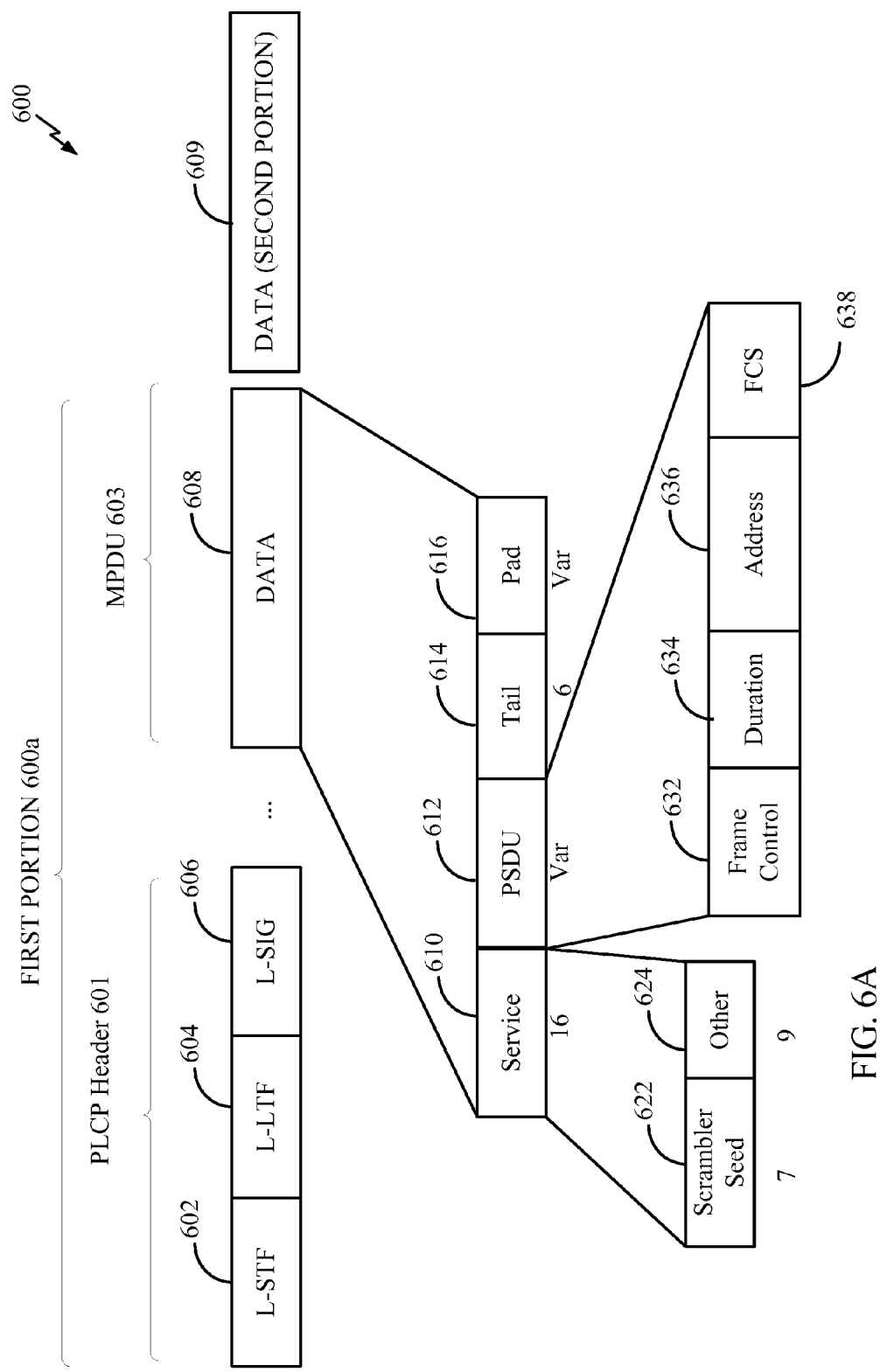
FIG. 6A illustrates an exemplary message for communicating multi-user uplink transmission information to both legacy and non-legacy devices.

FIG. 6A illustrates an exemplary message for communicating multi-user uplink transmission information to both legacy and non-legacy devices. The example message 600 includes fields corresponding to those described with respect to FIG. 5A. In some aspects, frame control field 632 may substantially conform with the format shown for frame control field 532 in FIG. 5B. In addition, the message 600 includes two data portions, MPDU 603, shown as data portion 608, and also a second data portion 609. Data portion 608 is equivalent to data 508 described with respect to FIG. 5A. This equivalency enables data portion 608 to be decoded by both legacy and non-legacy devices. Data portion 609 may be formatted in a manner that is not decodable by legacy devices. For example, the format of data portion 609 may not have been defined with some legacy devices were designed and/or produced. In some aspects, data portion 609 may be transmitted at a different data rate than data portion 608, and also at a higher rate than the first portion should in FIG. 6A, which includes the PLCP Header 601 and data portion 608. In some aspects, legacy devices may not be able to decode data portion 609 because of its higher data transmission rate.

In some aspects, data portion 609 may comprise information such as downlink data for specific receivers. In some aspects, data portion 609 may start with or include a Group ID that identifies a group of STAs to which a subsequent portion of data portion 609 is addressed. In some aspects, the presence of data portion 609 in frame 600 may be signaled to a device receiving frame 600. This signaling may be designed to not interfere with legacy devices decoding and processing of the first portion 600*a*. For example, in some aspects, a transmitter of frame 600 may set the address field 636 of data portion 608 based on whether the second portion 609 is present in a frame. When transmitting frame 500 of FIG. 5A, a transmitting device may set the address field 536 to a basic service set identifier (BSSID) of the transmitting device. When transmitting frame 600, which includes second portion 609, the transmitting device may set the address field 636 to a multicast version of the basic service set identifier (BSSID). A receiving device decoding the address field 536 and/or 636 may determine whether the address is a multicast address or not. If the field 536 and/or 636 is multicast, a receiving device may determine data portion 609 is present in the frame, while if the address is not multicast, the receiving device may determine data portion 609 is not present (i.e. a frame similar to frame 500 is being received). Other fields of frames 500 and 600 may be used to indicate whether the second portion 609 is present in a frame. For example, in some aspects, a frame subtype field (not shown) in the frame control field 632 may indicate whether the second portion 609 is present. In some aspects, a specific combination of frame type and subtype field (not shown) in the frame control field 632 may indicate whether the second portion 609 is present. In some aspects, a specific control subtype may indicate whether the second portion 609 is present. In some aspects, a specific control frame extension may indicate whether the second portion 609 is present. In some aspects, a specific extension subtype may indicate whether the second portion 609 is present. In some aspects, a specific control frame, control frame extension frame, or extension frame indicating the presence of second portion 609 may comprise the same subfields as a CTS MPDU (i.e. Frame Control, Duration, Address, FCS). In some aspects, the scrambler seed field 522 and/or 622 may indicate the presence of the second portion 609. In some aspects, a combination of a multicast version of the BSSID and a specific value of (part of) the scrambler seed may indicate the presence of the second portion 609. In some aspects, instead of a multicast version of the BSSID a localized version of the BSSID may be used. In some aspects, the L-SIG field 506/606 may indicate the presence of the data portion 609. For example, in some aspects, if the L-SIG field 506/506 indicates a length that is longer than the PLCP header 601 and first portion 608, a receiver may determine that the second portion 609 is present.

In some aspects, setting particular bits of the Frame Control (FC) field 632 included in the PSDU 612 may indicate the presence of the second portion 609. In some aspects, setting to one (1) one of the following subfields of the FC field 632 may indicate the presence of the second portion 609: To DS field (such as field 556 of FIG. 5B), From DS field (such as field 558 of FIG. 5B), More Frag field (such as field 560 of FIG. 5B), Retry field (such as field 562 of FIG. 5B), or a Protected Frame field (such as field 568 of FIG. 5B). In some aspects, if a combination of these subfields are set to one (1), the frame control field 632 may indicate the presence of second portion 609. In some aspects, a combination of these subfields set to one (1) in combination with particular values of a multicast address field 636 may indicate the presence of second portion 609. In some aspects, a specific value in the scrambler seed field 622 may also be used in conjunction with the fields discussed above to indicate that second portion 609 is present. In some aspects, the second portion 609 contains a second portion type field (not shown), which indicates a type of the second portion 609. In some aspects, the PSDU 612 may be a clear-to-send frame.

Figure 6B:
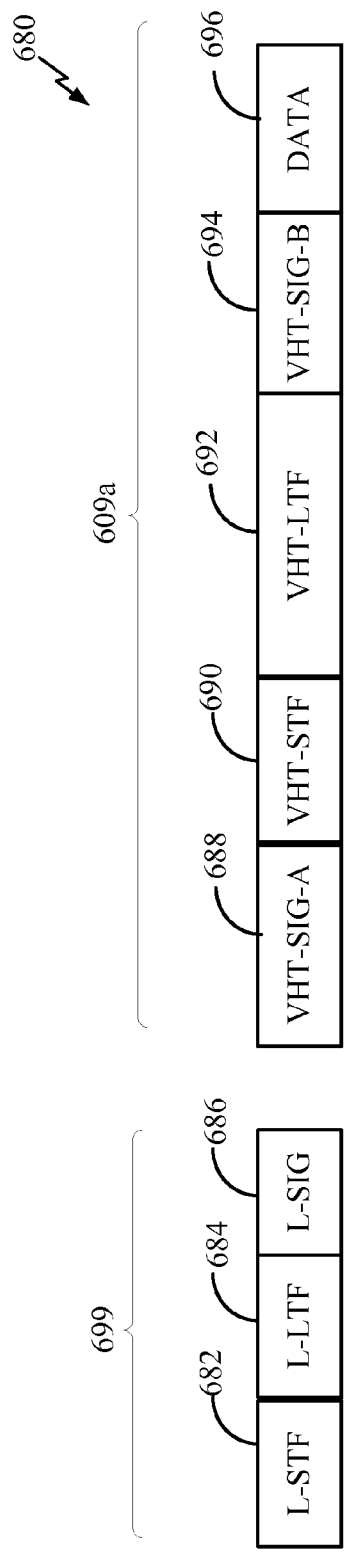
FIG. 6B is an illustration of one embodiment of a second portion.

FIG. 6B is an illustration of one embodiment of a second portion 609a. In some aspects, second portion 609a may start with or include a greenfield VHT PHY header preceding a downlink MU-MIMO transmission. A greenfield VHT PHY header is a VHT PHY header without a legacy OFDM portion 699, i.e. a VHT PHY header that starts at VHT SIG-A field 688 and omits the L-STF 682, L-LTF 684 and L-SIG 686 fields of the VHT PHY header. In some aspects, second portion 609a may comprise a modified greenfield VHT PHY header, which includes uplink (multi-user) transmission information. The uplink (multi-user) transmission may begin after the downlink VHT transmission, for example separated by a SIFS interval.

Figure 6C:
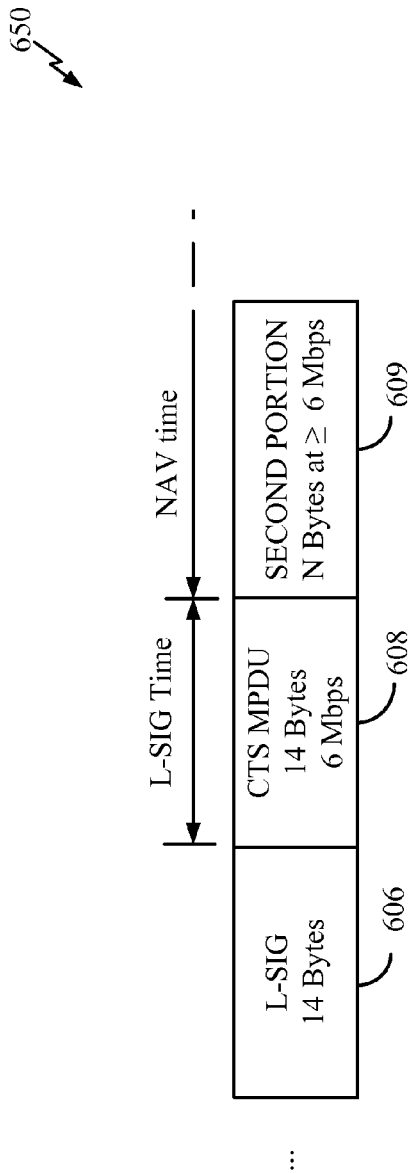
FIG. 6C is a simplified illustration of one embodiment of the PPDU described in FIG. 6A.

FIG. 6C is a simplified illustration of one embodiment of the PLCP Protocol Data Unit 600 described in FIG. 6A. As shown, the PPDU 650 includes a signal field 606, a MPDU 608, and a second portion 609. In the aspect shown in FIG. 6C, the L-SIG value defines a length of the MPDU 608, which in this case is a clear-to-send frame that is fourteen (14) bytes long. Since the signal field 606 is indicating a length equivalent to the length of the MPDU 608 (in this case a clear-to-send frame), a device receiving the PPDU 650 may determine whether the second portion 609 is present in the PPDU 650 based on some other field besides the signal field 606. For example, as discussed above, one or more of a subtype field, scrambler seed field, and/or address field may be used to determine whether the second portion 609 is present in the PPDU 650.

Figure 6D:
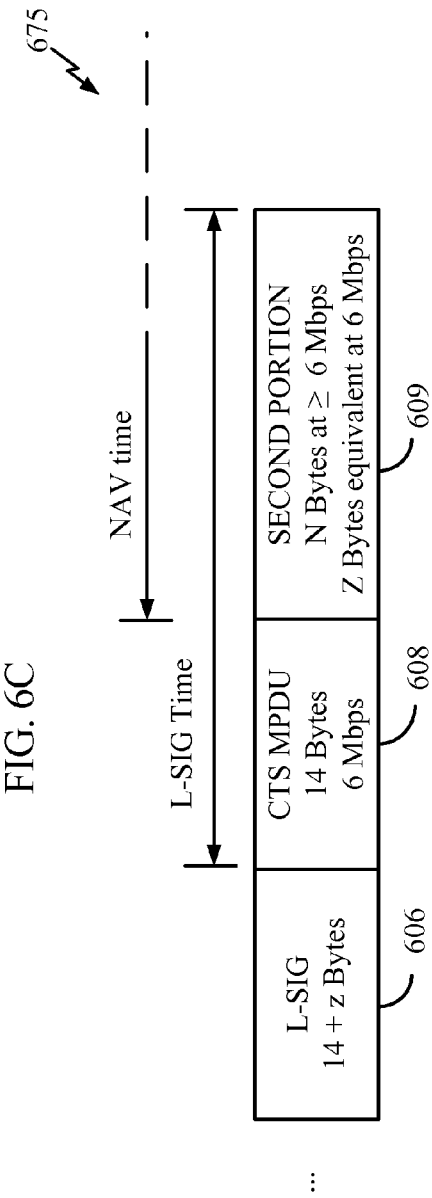
FIG. 6D is a simplified illustration of one embodiment of the PPDU described in FIG. 6A.

FIG. 6D is a simplified illustration of one embodiment of the PLCP Protocol Data Unit 600 described in FIG. 6A. As shown, the PLCP Protocol Data Unit 675 includes a signal field 606, a MPDU 608, and a second portion 609. In the aspect shown in FIG. 6D, the L-SIG value defines a length of the MPDU 608 which in this case is a clear-to-send frame that is fourteen (14) bytes long, plus an additional amount "z." The combined length of the MPDU (14) and the amount "z" indicates the transmission time of the PPDU 675 extends to the end of second portion 609. A device receiving the PLCP Protocol Data Unit 675 may determine whether the second portion 609 is present in the PPDU 675 based on the L-SIG field 606. For example, if the L-SIG filed 606 indicates a length greater than the length of the MPDU 608, a receiving device may determine the second portion 609 is present in the PPDU 675.

In some aspects, the network allocation vector (NAV) indicated in PPDU 675 is to be set after a time indicated by the L-SIG value. For example, the PPDU 675 may indicate that the NAV starts after completion of the transmission of the PPDU 675, including both the first portion 608 and second portion 609.

In some aspects, the first portion 608 may indicate a NAV that extends beyond the length of the second portion, as shown in FIG. 6D. In some aspects, the first portion 608 may indicate that a multi-user transmission will be performed after transmission of the second portion 609. The NAV indicated by the first portion 608 may provide protection for the multi-user transmission. In some aspects, the length of the second portion 609 is indicated by the second portion itself. For example, the second portion 609 may include a length field, perhaps early in the second portion, such that decoding devices can determine the length of the second portion. In some aspects, the L-SIG value 606 may indicate the length of the second portion as discussed above. In some other aspects, the length of the second portion may be predetermined. For example, in some aspects, the length of the second portion may be fixed. In some other aspects, the length of the second portion may be communicated to one or more receivers via separate message exchanges (not shown).

FIGS. 6E-H are simplified illustrations of embodiments of message exchanges that include provisions for extending the response time for a multi-user uplink transmission.

Figure 6E:
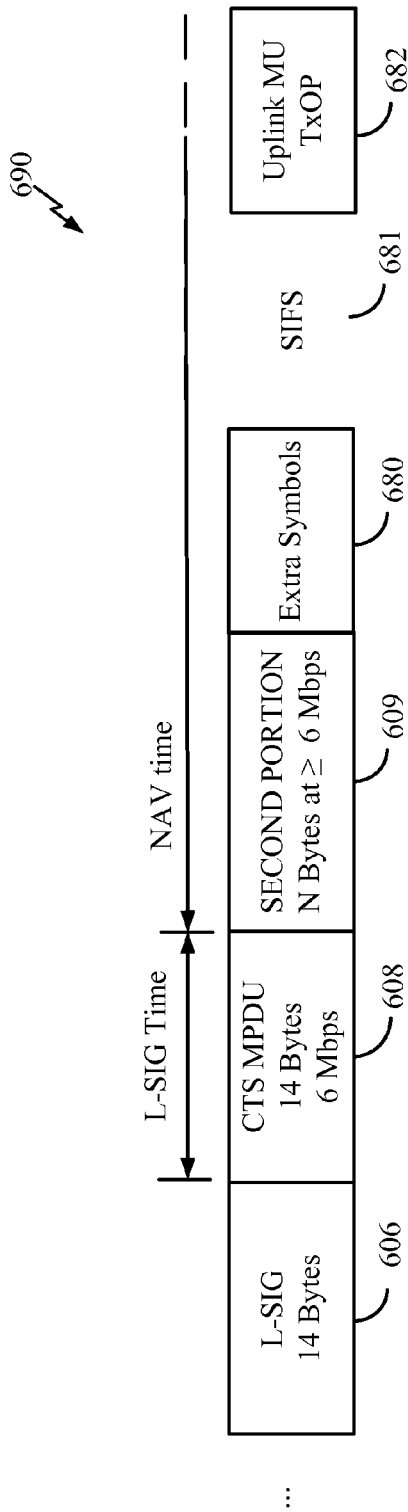
FIGS. 6E-H are simplified illustrations of embodiments of message exchanges that include provisions for extending the response time for a multi-user uplink transmission.

FIG. 6E illustrates a message exchange 690. The PPDU transmitted as part of message exchange 690 includes an signal field 606 that indicates the length of the CTS MPDU 608. Extra symbols 680 are transmitted after the second portion 609. In some aspects, the extra symbols 680 may be transmitted after a cyclic redundancy check field or a frame check sequence field of the second portion 609. The presence of these extra symbols 680 is known by devices that will perform an uplink transmission during the transmission opportunity 682. The presence of the extra symbols 680 enables the uplink transmitting devices to postpone their uplink transmissions until transmission of the extra symbols have been completed, and after the short inter-frame space (SIFS) time 681 has passed. This additional time between completion of the transmission of second portion 609 and the beginning of an uplink transmission may provide additional time for Phased Locked Loops (PLLs) to settle at the uplink transmitters.

Figure 6F:
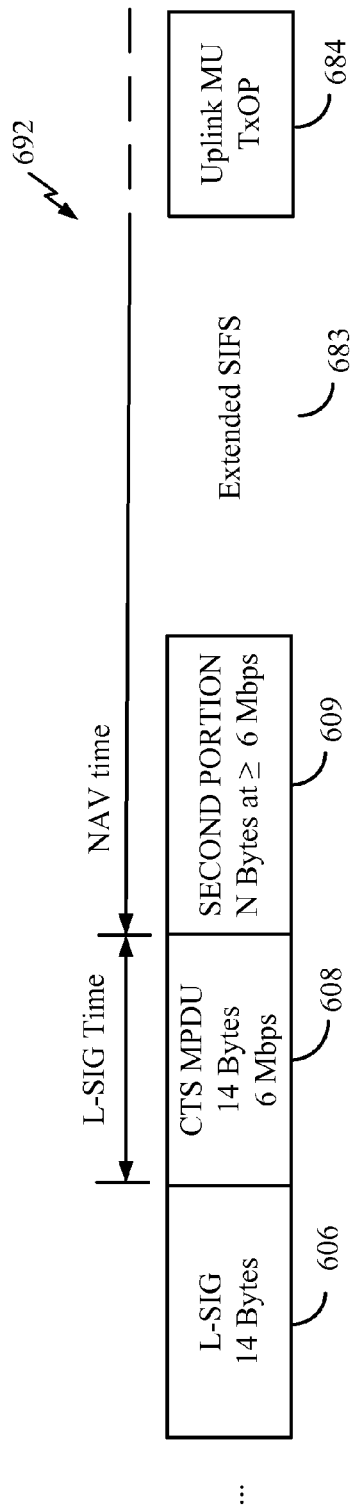

FIG. 6F illustrates an alternate message exchange 692. Message exchange 692 does not transmit the extra symbols 680 of FIG. 6E. Instead of transmitting extra symbols 680 and maintaining a consistent short inter-frame space SIFS time 681, message exchange 692 utilizes an extended short inter-frame space (SIFS) time 683. The extended short inter-frame space time 683 functions in a similar manner as the extra symbols and SIFS 681, in that it provides additional time after the transmission/reception of second portion 609 before an uplink transmission during TxOp 684 begins. In some aspects, the extended SIFS time may or may not be filled with extra (random) symbols. As discussed above, this additional time may provide for Phased Locked Loops (PLLs) to settle at uplink transmitters.

Figure 6G:
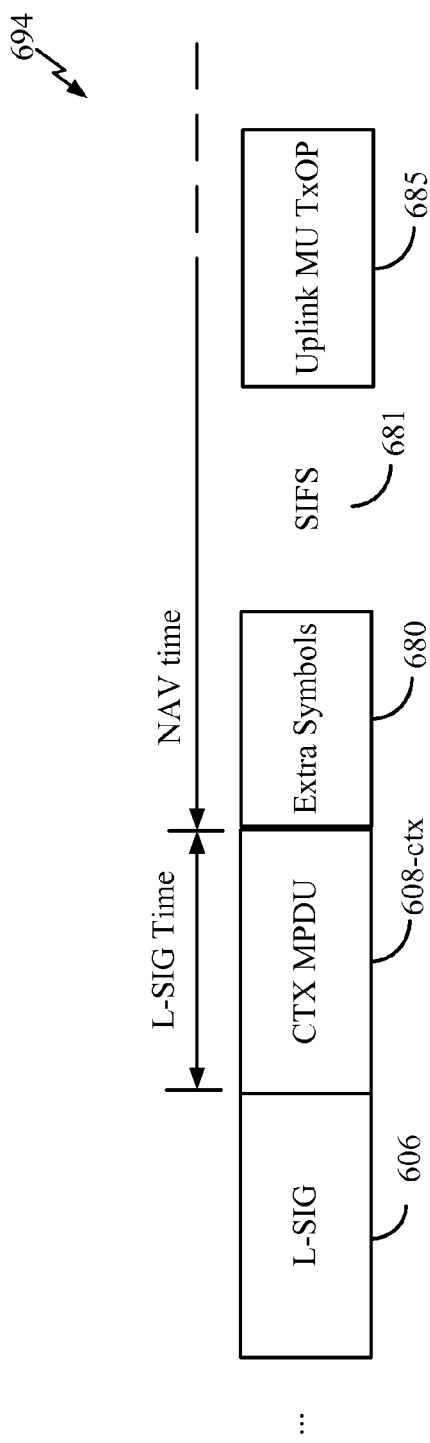

FIG. 6G also illustrates the use of extra symbols 680 during a message exchange 694. Message exchange 694 differs from message exchange 690 in that the signal field 606 of FIG. 6G may be followed by a CTX MPDU 608-ctx instead of a CTS MPDU 608 as illustrated in FIG. 6E. In some aspects, the extra symbols may be transmitted after a cyclic redundancy check field or a frame check sequence field of the CTX MPDU 608-ctx.

Figure 6H:
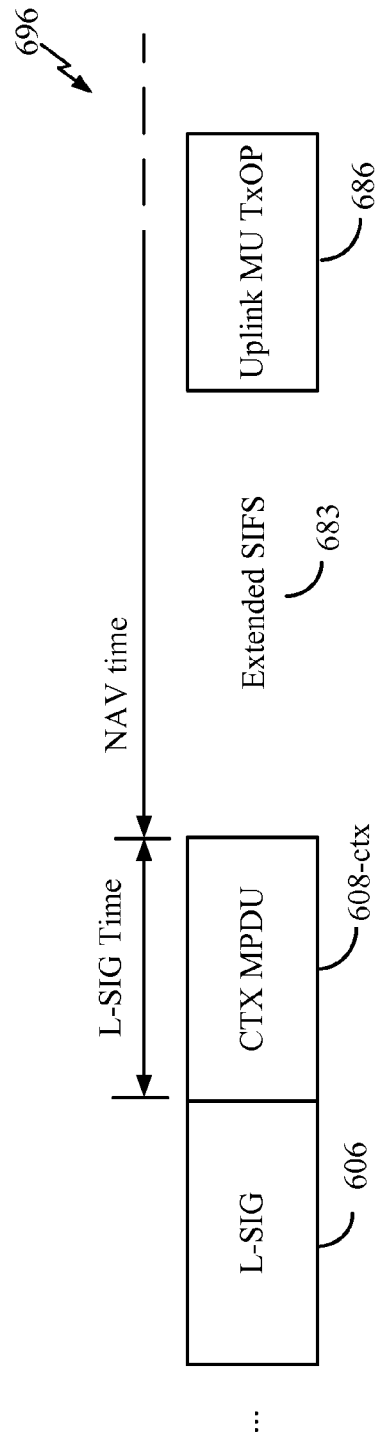

FIG. 6H illustrates a message exchange 696 including a CTX MPDU 608ctx that utilizes an extended SIFS time 683, instead of the extra symbols 680 as described above with respect to FIG. 6G. In some aspects, the extended SIFS time may or may not be filled with extra (random) symbols.

Figure 7:
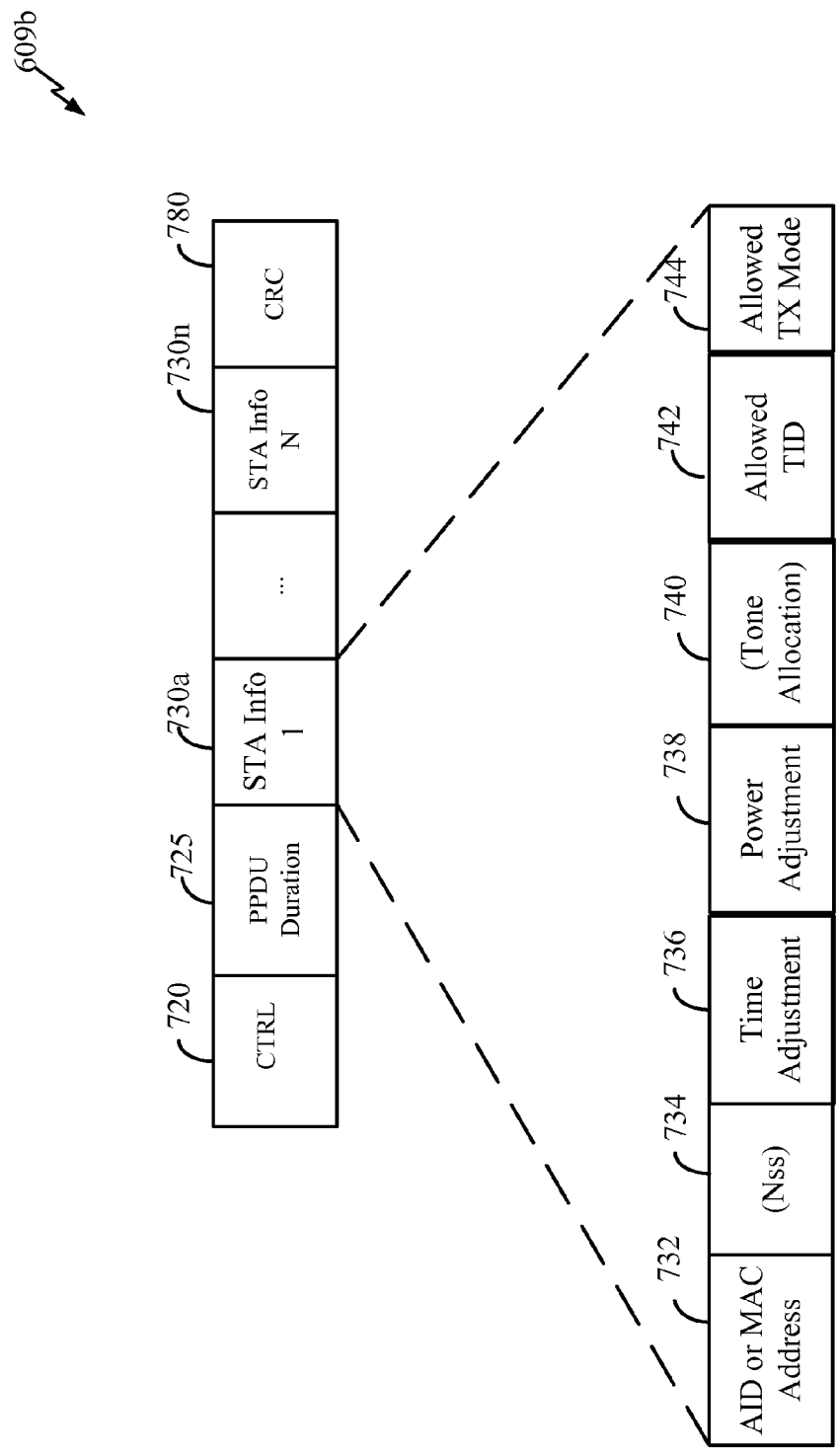
FIG. 7 is an example of a second portion of a PPDU.

FIG. 7 is an example of a second portion 609b of a PLCP Protocol Data Unit. The second portion includes a control (CTRL) field 720, a PLCP Protocol Data Unit duration field 725, a STA info field 730a-n, and an error check field 780. The CTRL field 720 is a generic field that may include information regarding the format of the remaining portion of the frame (e.g., the number of STA info fields and the presence or absence of any subfields within a STA info field), indications for rate adaptation for the user terminals 120, and/or an indication of allowed TID. The CTRL field 720 may also indicate if the multi-user transmission that follows the frame 600 is being used for UL MU MIMO or for UL FDMA or both, indicating whether a Nss or Tone allocation field is present in the STA Info field 1230. Alternatively, the indication of whether frame 600 is for UL MU MIMO or for UL FDMA can be based on the value of a subtype field in the frame control field 632, for example, as shown with respect to frame control field 532 of FIG. 5B, which includes a sub-type field 554. Note that UL MU MIMO and UL FDMA operations can be jointly performed by specifying to a STA both the spatial streams to be used and the channel to be used, in which case both fields are present in the second portion; in this case, the Nss indication is referred to a specific tone allocation. The PPDU duration 725 field indicates the duration of the following UL-MU-MIMO PPDU that the user terminals 120 are allowed to send. The STA Info fields 730a-n contain information regarding a particular STA and may include a per-STA (per user terminal 120) set of information (see STA Info 1 730a and STA Info N 730n). The STA Info fields 730a-n may include an AID or MAC address field 732 which identifies a STA, a number of spatial streams field (Nss) 734 field which indicates the number of spatial streams a STA may use (in an UL-MU-MIMO system), a Time Adjustment field 736 which indicates a time that a STA should adjust its transmission compared to the reception of a trigger frame (frame 600 in this case), a Power Adjustment field 738 which indicates a power back-off a STA should take from a declared transmit power, a Tone Allocation field 740 which indicates the tones or frequencies a STA may use (in a UL-FDMA system), an Allowed TID 742 field which indicates the allowable TID, an Allowed TX Mode 744 field which indicates the allowed TX modes. A user terminal 120 receiving a second portion 609 with an Allowed TID 742 indication may be allowed to transmit data only of that TID, data of the same or higher TID, data of the same or lower TID, any data, or only data of that TID first, then if no data is available, data of other TIDs.

Figure 8:
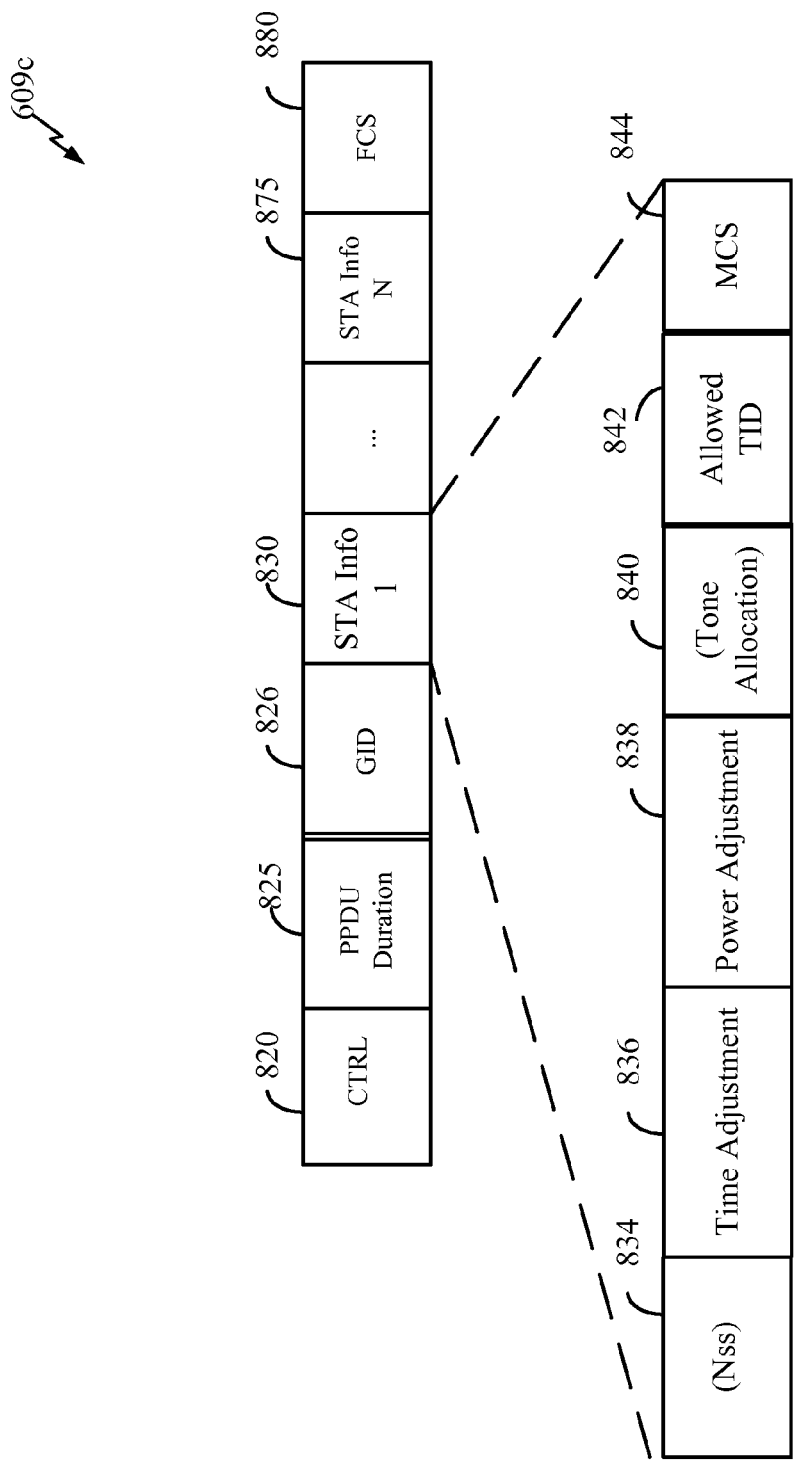
FIG. 8 illustrates another example of a second portion of a PPDU.

FIG. 8 illustrates another example of a second portion 609c of a PPDU. In this embodiment, the STA Info field 830 does not contain the AID or MAC Address field (such as field 732) and instead the second portion 609 includes a group identifier (GID) 826 field which identifies the STAs by a group identifier rather than an individual identifier.

Figure 9:
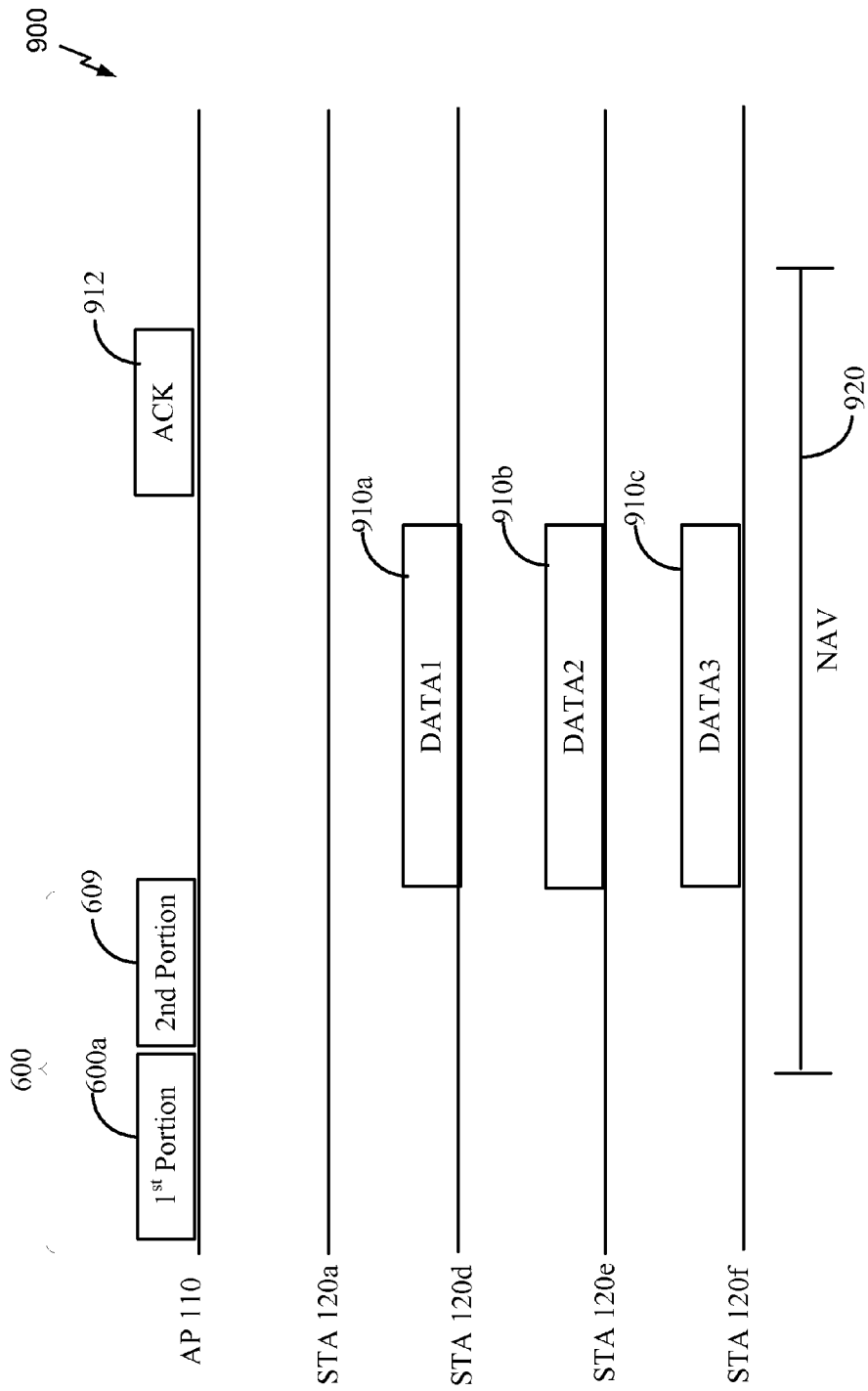
FIG. 9 is a message timing diagram for one implementation of multi-user uplink transmission.

FIG. 9 is a message timing diagram for one implementation of multi-user uplink transmission. The diagram begins with the AP 110 transmitting PPDU 600 of FIG. 6A, which includes a first portion 608 and a second portion 609. In some aspects, the first portion may define a contention free period on the wireless medium. For example, in some aspects, the first portion may be a clear-to-send frame. The first portion may be configured such that it can be readily decoded by both legacy and non-legacy devices. For example, the first portion may be decodable by both the devices in device set 402a and device set 402b illustrated in FIG. 4. Therefore, the STAs 120a and 120d-f shown in FIG. 9 can decode the first portion 608. In some aspects, the decodability of first portion 608 relates to its format. For example, in some aspects, both the first and second sets of devices are configured to decode the allocation and values of fields comprising the first portion. In some aspects, the decodability of the first portion 608 relates to a rate at which the AP 110 transmits the first portion. For example, in some aspects, the first portion 608 may be transmitted at 6 Mbps OFDM. In some aspects, all of STAs 120a and 120d-f may be able to decode frames transmitted at this rate. In some aspects, the first portion may be decoded by the STA 120a and STAs 120d-f to indicate how to set a network allocation vector, which defines a contention free period 920 on the wireless medium.

The second portion 609 may not be decodable by both the first and second groups of devices illustrated in FIG. 4. For example, the second portion 609 may be decodable only by the group of devices in group 402b. In some aspects, the second portion 609 is transmitted by the AP 110 at a higher data rate than the first portion 608. For example, in some aspects, the second portion 609 is transmitted at 12 or 24 Mbps. In some aspects, transmission of the second portion at this rate is conditional on whether intended recipients of the second portion (in this case, STAs 120d-f) are near enough to be able to receive frames transmitted at the higher rate.

When the second portion 609 is transmitted at a higher rate, STA 120a may not be able to decode the second portion 609. However, the transmission of second portion 609 does not interfere with STA 120a's ability to decode the first portion 608. Therefore, STA 120a is still able to set its NAV as shown by NAV 920.

As discussed above with respect to FIGS. 7 and 8, the second portion may include information defining how a multi-user uplink transmission performed during non-contention period 920 will be performed. For example, the second portion may indicate to one or more of STAs 120d-f that they may perform a multi-user transmission during the non-contention period 920 and which multi-user parameters control the transmission (such as which tones should be used in an UL-OFDM transmission or the number of spatial streams used in a UL-MU-MIMO transmission). In some aspects, scheduling information controlling the multi-user transmission included in the second portion may include an indication of one or more stations that should participate in the OFDMA and/or MU-MIMO multi-user transmission (such as station identifiers, MAC addresses, association identifiers, group identifiers, etc). The scheduling information may also define one or more of bandwidth and/or subband information for each device transmitting during the multi-user transmission, how many spatial streams should be included in the multi-user transmission, and/or which device is assigned to which spatial stream, the modulation and coding scheme (MCS) for the multi-user transmission, and the maximum length of the multi-user transmission.

Stations receiving the second portion may then decode the second portion to decode one or more of the scheduling parameters controlling the multi-user transmission, and perform the multi-user transmission as specified by the decoded parameters.

In the illustrated message sequence of FIG. 9, the second portion indicates to each of STAs 120d-f that they should transmit during the contention free period 920. After the PPDU 600 is transmitted, STA 120a defers any pending transmissions during the contention free period 920. Since each of STAs 120d-f was provided with an indication to transmit by the second portion 609, each of STAs 120d-f transmits data 910a-c during the contention free period 920. Each of data transmissions 910a-c is based on multi-user uplink transmission parameters provided by the second portion 609.

Figure 10A:
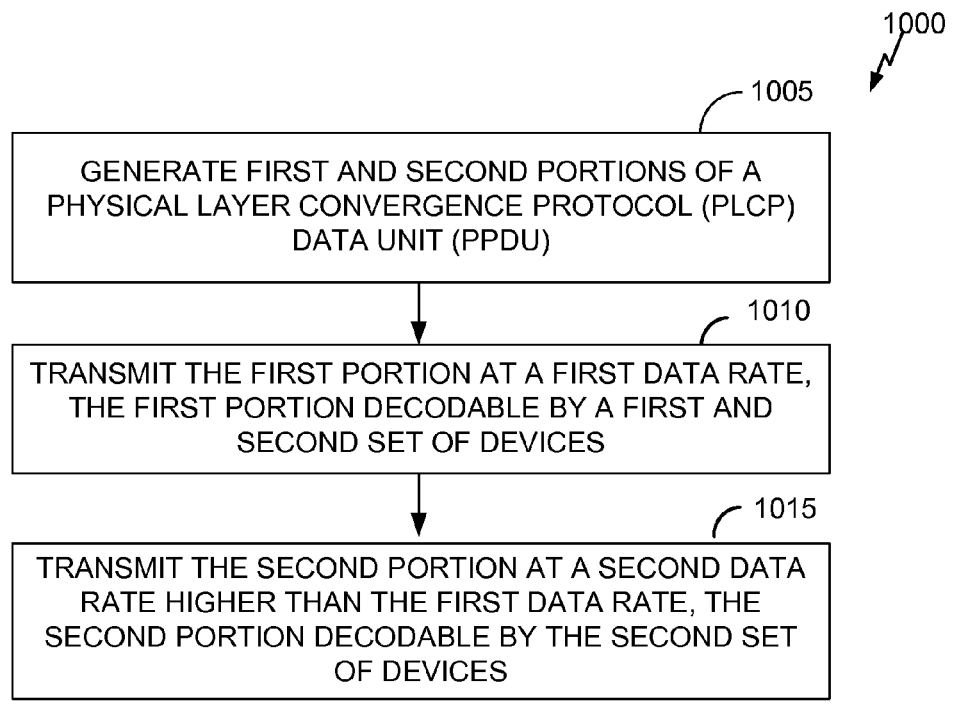
FIG. 10A is a flowchart of a method for multi-user uplink communication on a wireless network.

FIG. 10A is a flowchart of a method for multi-user uplink communication on a wireless network. In some aspects, the method 1000 may be performed by the AP 110 and/or the wireless device 302. FIG. 10A describes a method of controlling a multi-user uplink transmission on a wireless medium that is compatible with devices capable of multi-user uplink transmissions and also with devices that may not be configured to operate in a multi-user uplink environment. For example, legacy devices may not have programming logic so as to decode and properly interpret multi-user control data, such as that described above with respect to the second portion 609. By transmitting a physical layer convergence protocol data unit that includes two portions, compatibility with both legacy devices, and devices that support multi-user uplink transmissions may be achieved.

In block 1005, first and second portions of a physical layer convergence protocol data unit are generated. In some aspects, the first portion is generated to indicate a duration of a contention free period on the wireless medium. For example, in some aspects, the first portion includes a clear-to-send frame.

In some aspects, the first portion is generated to indicate the presence of the second portion in the PPDU. In some aspects, the first portion is generated to include a signal field storing a value indicating a length greater than a length of the first portion. For example, in some aspects, the L-SIG field 606 of PPDU 600 may be generated to store a value indicating a length greater than the length of first portion 608. In some aspects, the first portion is generated to include a duration field, the duration field indicating a length greater than a length of the first portion. This may indicate to receiving devices that the second portion is present in some aspects.

In some aspects, a specific value greater than the length of first portion 608 may be used to indicate the presence of a second portion 609 in the physical layer convergence protocol data unit. For example, in some aspects, a length value of 0xFFFF may indicate the presence of the second portion.

In some aspects the first portion may be generated to include a scrambler seed value, with the scrambler seed value indicating the presence or absence of the second portion. For example, in some aspects, scrambler seed field 622 may be generated with a value that indicates the presence or absence of the second portion. In some aspects, the scrambler seed value is used in combination with the L-SIG field described above to indicate the presence or absence of the second portion.

In some aspects, the first portion may be generated to include a type field and a subtype field. For example, the frame control field 632 may include a type and subtype field, for example, as shown with respect to frame control field 532 of FIG. 5B, which includes a type field 552 and sub-type field 554. In some aspects, the subtype field 554 may be generated with a value that indicates the presence or absence of the second portion.

In some aspects, the first portion may be generated to set one or more combinations of fields in a frame control field, such as frame control field 632 illustrated in FIG. 6A, to indicate whether a second portion is present. For example, one or more of a "To DS" field, "From DS" field, "More Frag" field, "Retry" field, or "Protected Frame" field may be generated to have a value of one (1) to indicate the second portion is present, while generating the frame control field to have one or more of these fields with a value of zero (0) may indicate a second portion is not present.

In some aspects, one or more fields of a frame control field, along with one or more of a scrambler seed field, such as scrambler seed field 622, and/or an address field, such as address field 636 may be generated to indicate whether the second portion is present. For example, if the address field 636 is generated to indicate a multicast address, and one or more particular fields of the frame control field 632 are generated to have a value of one (1), this may indicate that the second portion is present in some aspects.

In some aspects, the first portion may be generated to include an address field, such as address field 636. In some aspects, the address field may be generated to include a value that indicates the presence or absence of the second portion. For example, in some aspects, whether the address field includes a multicast address or a non-multicast address may indicate whether the second portion is present in the physical layer convergence protocol data unit. In some aspects, whether the address field includes a localized address or a non-localized address may indicate whether the second portion is present in the physical layer convergence protocol data unit.

In some aspects, the second portion is generated to include an error check value for the second portion. For example, in some aspects, the second portion may be generated to include a parity bit and/or cyclic redundancy check (CRC) value for the second portion.

In some aspects, the second portion is generated to indicate control data for a multi-user uplink transmission. For example, the second portion may be generated to identify a plurality of devices. In some aspects, the plurality of devices are each identified by their station address or their association identifier. In some aspects, the second portion may specify a group identifier, which identifies a group of devices that may perform a multi-user uplink transmission following transmission of the first and second portions.

In some aspects, the second portion is also generated to indicate a plurality of indications of multi-user transmission opportunities corresponding to each of the association identifiers. For example, for each device identified in the second portion as performing a portion of the multi-user uplink transmission, transmission parameters for that device's transmission may be included in the second portion. As described with respect to FIGS. 7 and 8, transmission parameters such as tone allocations (field 740 and 840) and/or the number of spatial streams (fields 734 and 834) may be indicated in the second portion. Other fields shown in the embodiment of second portions 609a-c of FIG. 6B, 8, or 9 may be included in the second portion. In some aspects, the second portion may include multi-user transmission scheduling information such as bandwidth and/or subband assignments for one or more of the devices participating in the defined multi-user communication, how many spatial streams will be utilized by the multi-user transmission, the modulation and coding scheme (MCS) to be used by each device participating in the multi-user transmission and/or the length of the multi-user transmission.

In block 1010, the first portion is transmitted at a first data rate. As discussed above with respect to FIG. 9, the first portion is configured and transmitted to be decodable by both a first and second sets of devices. For example, the first portion may be decodable by legacy devices that are not configured to support multi-user uplink transmissions. The first portion may be transmitted at a data rate decodable by these legacy devices. For example, the first portion may be transmitted at six (6) Mbps OFDM.

In block 1015, the second portion is transmitted at a second data rate higher than the first data rate. The second portion is configured and transmitted such that it may be decoded by a second set of devices. The second set of devices and the first set of devices do not overlap. In some aspects, the second portion is transmitted at 12 or 24 Mbps.

Some aspects of process 1000 also include receiving a network message. The network message may indicate the data rate at which the second portion and/or the first portions should be sent. In some aspects the first and/or second portions are then transmitted at the appropriate data rate(s) indicated by the network message. In some aspects, the network message is received from an access point or a station. In some aspects, the received network message is a management frame.

In some aspects, process 1000 includes transmitting one or more additional symbols after transmission of the second portion. In some aspects, the additional symbols may be transmitted after a CRC or FCS covering the second portion is transmitted (as part of the second portion at least in some aspects). In some aspects, these additional symbols provide time for a receiving device's phase locked loop (PLL) to settle before a multi-user uplink transmission begins. In some aspects, the additional symbols may contain no information that needs to be received by any devices that will perform a multi-user uplink transmission during the upcoming transmission opportunity. In some aspects, the additional symbols are transmitted to contain random data. In some aspects, a multi-user uplink transmission is then received short inter-frame space time (SIFS) after transmission of the additional symbols completes.

In some other aspects, process 1000 includes receiving a multi-user uplink transmission after an extended short inter-frame space (SIFS) time that is longer than the standard SIFS time. This extended SIFS time also provides additional PLL (Phase locked Loop) settlement time for a device performing a multi-user uplink transmission during the transmission opportunity following the extended SIFS.

Figure 10B:
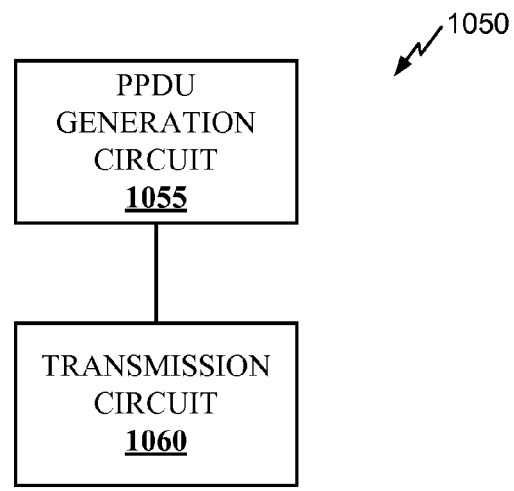
FIG. 10B is a functional block diagram of an apparatus for wireless communication, in accordance with certain embodiments described herein.

FIG. 10B is a functional block diagram of an apparatus 1050 for wireless communication, in accordance with certain embodiments described herein. In some aspects, the apparatus 1050 is the device 302. Those skilled in the art will appreciate that the apparatus 1050 may have more components than the simplified block diagrams shown in FIG. 10B. FIG. 10B includes only those components useful for describing some prominent features of implementations within the scope of the claims.

The apparatus 1050 comprises a PLCP Protocol Data Unit generation circuit 1055. In some aspects, the PLCP Protocol Data Unit generation circuit 1055 may be configured to perform one or more of the functions described above with respect to block 1005. In some aspects, the PLCP Protocol Data Unit generation circuit 1055 may include the processor 304. The apparatus 1050 further comprises a transmission circuit 1060. In some aspects, the transmission circuit 1060 may be configured to perform one or more of the functions described above with respect to block 1010 and/or 1015. In some aspects, the transmission circuit 1060 may include the transmitter 310.

Figure 11A:
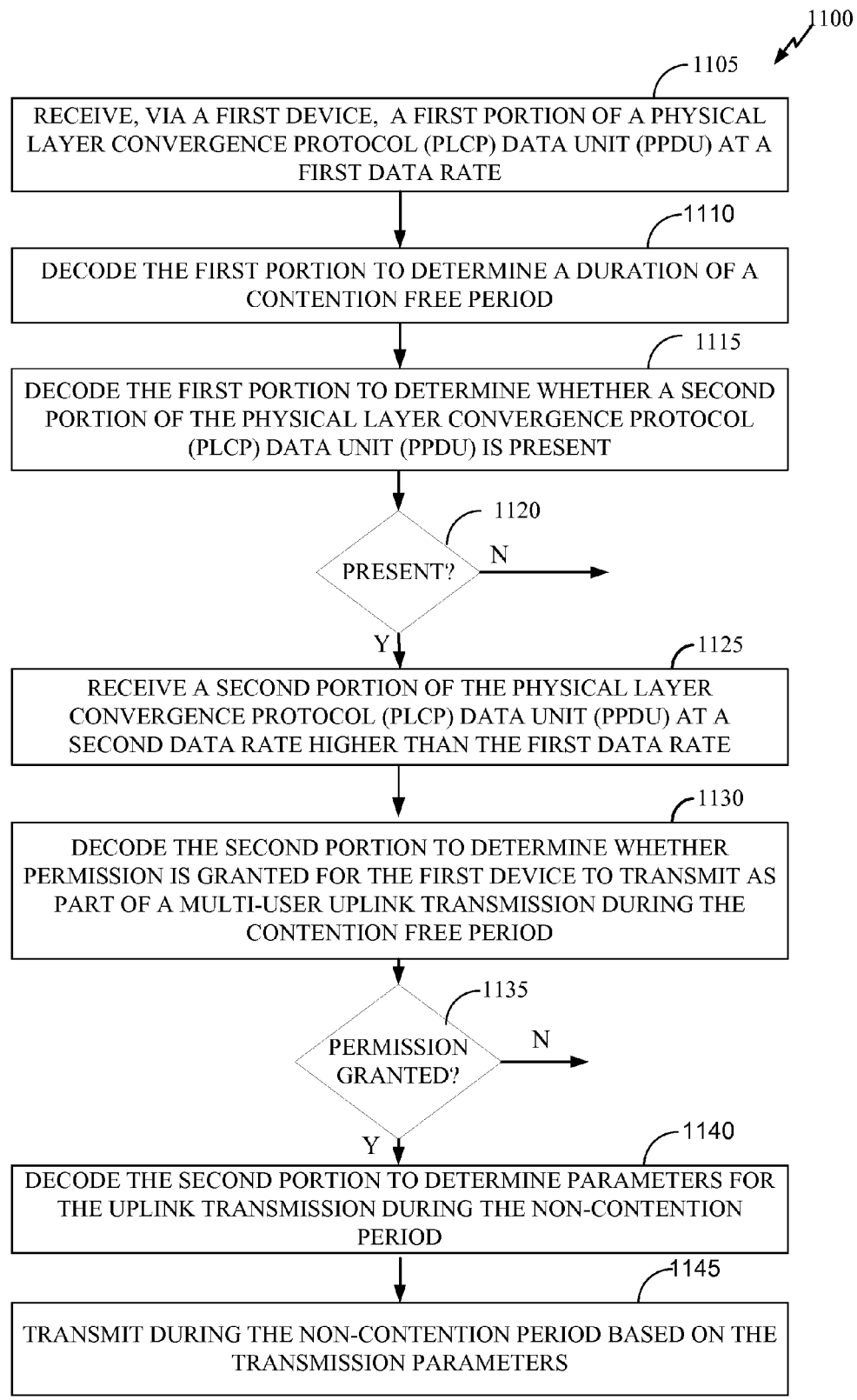
FIG. 11A is a flowchart of a method for multi-user uplink communication on a wireless network.

FIG. 11A is a flowchart of a method for multi-user uplink communication on a wireless network. In some aspects, the method 1100 may be performed by the stations 120*d-f* illustrated in FIG. 4 and/or FIG. 9, and/or the wireless device 302. FIG. 11A describes a method of receiving control information for a multi-user uplink transmission on a wireless medium that is compatible with devices that may not be configured to operate in a multi-user uplink environment. For example, a first set of devices, such as legacy devices, may not have hardware and/or programming logic so as to decode and properly interpret multi-user uplink transmission control data, such as that described above with respect to the second portion 609. By first receiving a first portion of a physical layer convergence protocol data unit that is decodable by a first and second sets of devices, certain information relating to a non-contention period may be received by both a first and second sets of devices (for example, legacy and non-legacy devices). For example, a duration of a non-contention period may be determined from the first portion such that a network allocation vector may be properly set by both the first and second sets of devices operating on the wireless medium. For example, the first portion may be decoded by the first and second sets of devices as a clear-to-send frame, which is understood by these devices to set a duration of a network allocation vector that defines a non-contention or contention free period on the wireless network. In some aspects, the value of the duration field may indicate to a receiving device whether the second portion is present in the received frame. For example, if the duration field stores a value that is greater than a threshold, it may indicate the second portion is present. Alternatively, if the duration field stores a value that is greater than a length of the first portion plus an additional threshold then it may indicate the second portion is present. Correspondingly, if the duration field does not exceed the parameters discussed above then the duration field may indicate no second portion is present.

Those devices capable of multi-user uplink transmissions (for example, the second set of devices discussed above) may then receive and decode a second portion of the PPDU that includes control information relating to the multi-user uplink transmission to occur during the contention free period. The second set of devices may be configured to determine whether the second portion is present in the PPDU based on one or more fields of the first portion, as discussed above and below.

The second portion may also be sent at a different data rate than the first portion because, in some aspects, the second set of devices have improved receive capabilities relative to the first set of devices. This improved set of capabilities may include the ability to receive data at a higher data rate(s) than can be supported by the first set of, possible legacy, devices. Transmitting/receiving the second portion at a higher data rate may improve network utilization and efficiency. While method 1100 is illustrated as including several blocks, it should be understood that not all blocks are performed in all aspects of method 1100.

In block 1105, a first portion of a PLCP Protocol Data Unit is received by a first device at a first data rate. In some aspects, the first device is a station, such as any of stations 120*d-f* discussed above. In block 1110, the first portion is decoded to determine a duration of a contention free period. For example, as discussed above with respect to FIG. 9, the first portion may be decoded to set a network allocation vector, which defines a contention free period 920. In some aspects, the first portion is decoded as a clear-to-send frame.

In block 1115, the first portion is decoded to determine whether a second portion of the PPDU is present. In some aspects, a signal field, such as signal field 606 is decoded for determining the presence of the second portion. For example, if the signal field indicates a length of the PPDU that is greater than the length of the first portion, process 1100 may determine that the second portion is present.

Alternatively, if the length indicated by the signal field is a specific value, with the specific value also being greater than the length of the first portion, then process 1100 may determine the second portion is present. In some aspects, a duration field of the first portion may be decoded for determining whether the second portion is present. For example, if the duration field is greater than a threshold, the second portion may be determined to be present. Alternatively, if the duration field stores a value that is greater than a length of the first portion and an additional threshold or offset period of time then the duration may indicate the second portion is present. Correspondingly, if the duration field does not exceed the parameters discussed above then the duration field may indicate no second portion is present.

In some aspects, a scrambler seed value, such as scrambler seed 622 illustrated in FIG. 6A may be decoded for determining whether the second portion is present. For example, if particular bits or combinations of bits are set to particular values, process 1100 may determine the second portion is present. In some aspects, a combination of particular scrambler seed values and signal field values may be used for determining whether the second portion is present.

In some aspects, a control frame included in the first portion may include a frame control field, the frame control field defining a type field and a subtype field. In some aspects, specific values of the subtype field may indicate the presence or absence of the second portion in the PPDU. In some aspects, one or more combinations of fields in a frame control field, such as frame control field 632 illustrated in FIG. 6A, may be decoded for determining whether a second portion is present. For example, one or more of a "To DS" field, "From DS" field, "More Frag" field, "Retry" field, or "Protected Frame" field may be decoded for determining whether the second portion is present. In some aspects, one or more fields of a frame control field, along with one or more of a scrambler seed field, such as scrambler seed field 622, and/or an address field, such as address field 636 may be decoded for determining whether the second portion is present. For example, if the address field 636 represents a multicast address, and one or more particular fields of the frame control field 632 are set to one (1), this may indicate that the second portion is present in some aspects.

In some aspects, an address field of the first portion may be decoded for determining whether the second portion is present in the PPDU. For example, if the address field is a multicast address or a localized address, method 1100 may determine the second portion is present. In some aspects, if the address field is both multicast and localized, the method 1100 may determine the second portion is present, but otherwise the second portion may be determined not to be present.

If the second portion is not present, decision block 1120 takes the "No" branch, and processing continues. If the second portion is present, process 1100 moves to block 1125, where, at least non-legacy devices capable of receiving at a second data rate do receive the second portion at the second data rate, which is higher than the first data rate. In some aspects, the second portion may be received at the same data rate as the first portion. However, even when the first and second portions are received at the same data rate, the conditional processing described above with respect to block 1115, where the first device determines whether the second portion is still present, may still be performed.

In block 1130, the second portion is decoded for determining whether permission is granted for the first device to transmit as part of a multi-user uplink transmission during the non-contention period. In other words, multiple devices may transmit during the non-contention period, with each device transmitting using at least some differing transmission parameters. Thus, any individual transmitting device represents only a portion of the total multi-user transmission occurring during the non-contention period.

In some aspects, whether permission is granted is based on whether the first device is identified in the second portion of the PPDU via the first devices's address, AID, or a group identifier associated with the first device (as shown and discussed above with respect to FIGS. 7-8). If the first device is not identified in the second portion, decision block 1135 takes the "No" branch, and processing continues. If the first device is identified, block 1140 decodes the second portion for determining parameters for the uplink transmission during the non-contention period. In some aspects, these parameters may include one or more of the parameters discussed above with respect to FIGS. 7 and/or 8. In some aspects, the parameters or scheduling information may include one or more of bandwidth and/or subband assignments for one or more devices participating in the multi-user transmission, how many spatial streams are utilized in the multi-user transmission, the modulation and coding scheme (MCS) used by each device participating in the multi-user transmission, and a maximum length of the multi-user transmission. In block 1145, the first device performs part of a multi-user uplink transmission during the non-contention period based on the decoded transmission parameters.

In some aspects, once the second portion is determined to be present, and is received by method 1100 in block 1125, an error check value may be decoded from the second portion. The error check value could be, in various aspects, a parity bit or a cyclic redundancy check (CRC) or any other error check value known in the art. An error detection method may then be performed on the second portion based on the error check value included in the second portion. If an error is detected, the second portion may be ignored by method 1100 and not processed further.

In some aspects of method 1100, a separate network message is received by the first device indicating a transmission data rate of the second portion. This indicated transmission data rate may be stored by the first device and relied on to determine a receiving and/or decoding rate of second portions received subsequent to the separate network message.

Therefore, the receiving and/or decoding of the second portion may then be based on the data rate indicated by the network message. In some aspects, the network message is a management frame, perhaps transmitted by an access point. In some aspects, the network message is not separate, but instead may be just the first portion.

In some aspects, process 1100 includes receiving one or more additional symbols after reception of the second portion. The received additional symbols may contain random information in some aspects. In some aspects, the additional symbols may be received after a CRC or FCS covering the second portion is received. In some aspects, these additional symbols provide time for a phase locked loop (PLL) of a receiving device (for example, a device performing process 1100) to settle before a multi-user uplink transmission begins. In some aspects, a multi-user uplink transmission is then initiated (performed) short inter-frame space time (SIFS) after reception of the additional symbols completes.

In some other aspects, process 1100 includes transmitting a multi-user uplink transmission after an extended short inter-frame space (SIFS) time that is longer than the standard SIFS time. This extended SIFS time also provides additional PLL (Phase locked Loop) settlement time for a device performing a multi-user uplink transmission during the transmission opportunity following the extended SIFS.

Figure 11B:
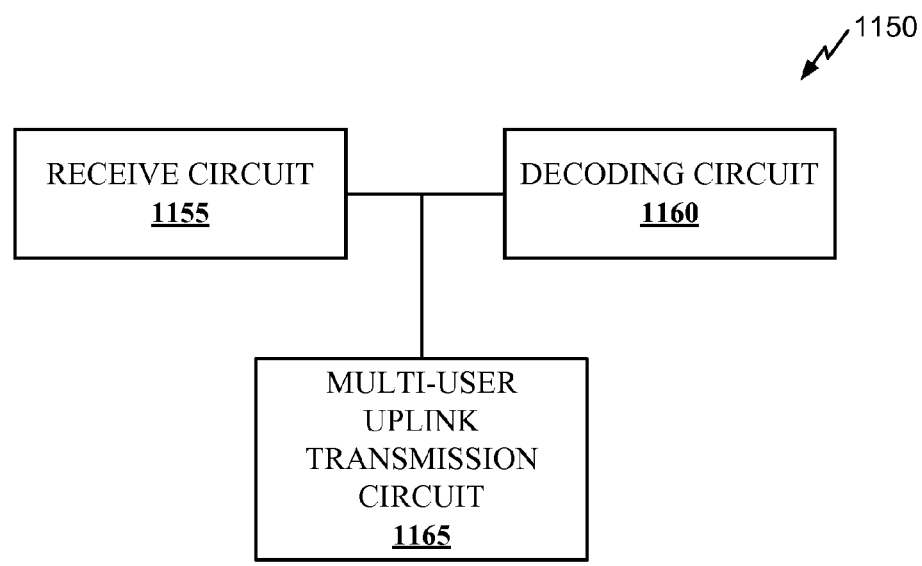
FIG. 11B is a functional block diagram of an apparatus for wireless communication, in accordance with certain embodiments described herein.

FIG. 11B is a functional block diagram of an apparatus 1150 for wireless communication, in accordance with certain embodiments described herein. In some aspects, the apparatus 1150 is the device 302. Those skilled in the art will appreciate that the apparatus 1150 may have more components than the simplified block diagrams shown in FIG. 11B. FIG. 11B includes only those components useful for describing some prominent features of implementations within the scope of the claims.

The apparatus 1150 includes a receive circuit 1155. The receive circuit 1155 may be configured to perform one or more of the functions discussed above with respect to blocks 1105 and/or 1125. In some aspects, the receive circuit 1155 includes the receiver 312. The apparatus 1150 also includes a decoding circuit 1160. The decoding circuit 1160 may be configured to perform one or more of the functions discussed above with respect to blocks 1110, 1115, 1120, 1130, 1135, and/or 1140. In some aspects, the decoding circuit 1160 may include the processor 304. The device 1150 also includes a multi-user uplink transmission circuit 1165. In some aspects, the multi-user uplink transmission circuit 1165 may be configured to perform one or more of the functions discussed above with respect to block 1145. In some aspects, the multi-user uplink transmission circuit 1165 may include the transmitter 310.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of transmitting a physical layer convergence protocol data unit on a wireless medium, comprising:
   generating a first portion of the physical layer convergence protocol data unit, the first portion including a clear-to-send frame having a signal field;
   generating a second portion of the physical layer convergence protocol data unit, the second portion generated to indicate scheduling information for a multi-user transmission and an identification of one or more devices of the second set of devices that will communicate during the multi-user transmission, wherein the identification includes at least one of a station identifier, group identifier, and association identifier for each of the one or more second set of devices;
   transmitting the first portion at a first data rate, the first portion decodable by a first and second sets of devices; and
   transmitting the second portion at a second data rate higher than the first data rate, the second portion decodable by the second set of devices,
   wherein the signal field indicates a length of the physical layer convergence protocol data unit greater than a length of the clear-to-send frame, the indicated length including at least a portion of the length of the clear-to-send frame, and
   wherein the generating of the second portion includes generating an indication of one or more of a modulation and coding scheme (MCS), bandwidth, sub-band, spatial stream information, and length information for the multi-user transmission.

2. The method of claim 1, wherein the generating of the first portion includes generating a duration field, the duration field including a data value greater than a combined length of the first and second portions.

3. The method of claim 1, wherein the generating of the second portion includes generating an indication of a length of the second portion.

4. The method of claim 1, wherein the signal field indicates an end position of the second portion.

5. The method of claim 1, wherein the signal field indicates the second portion is present in the physical layer convergence protocol data unit.

6. The method of claim 5, further comprising generating the first portion to include a duration field, and generating the first portion to indicate a presence of the second portion by setting the duration field to indicate a length greater than a predetermined value.

7. An apparatus for transmitting a physical layer convergence protocol data unit on a wireless medium, comprising:
   a processor configured to:
      generate a first portion of the physical layer convergence protocol data unit, the first portion including a clear-to-send frame having a signal field, and
      generate a second portion of the physical layer convergence protocol data unit, the second portion generated to indicate scheduling information for a multi-user transmission and an identification of one or more devices of the second set of devices that will communicate during the multi-user transmission, wherein the identification includes at least one of a station identifier, group identifier, and association identifier for each of the one or more second set of devices;
   a transmitter configured to:
      transmit the first portion at a first data rate, the first portion decodable by a first and second sets of devices, and
      transmit the second portion at a second data rate higher than the first data rate, the second portion decodable by the second set of devices,
      wherein the signal field indicates a length of the physical layer convergence protocol data unit greater than a length of the clear-to-send frame, the indicated length including at least a portion of the length of the clear-to-send frame, and
      wherein the generation of the second portion includes generating an indication of one or more of a modulation and coding scheme (MCS), bandwidth, sub-band, spatial stream information, and length information for the multi-user transmission.

8. The apparatus of claim 7, wherein the generation of the first portion includes generating a duration field storing a value greater than a combined length of the first and second portions.

9. The apparatus of claim 7, wherein the generation of the second portion includes generating an indication of a length of the second portion.

10. The apparatus of claim 7, wherein the signal field indicates an end position of the second portion.

11. A method of receiving a physical layer convergence protocol data unit on a wireless medium, comprising:
   receiving, by a wireless device, a first portion of the physical layer convergence protocol data unit, the first portion including a clear-to-send frame having a signal field, wherein the signal field indicates a length of the physical layer convergence protocol data unit greater than a length of the clear-to-send frame, the indicated length including at least a portion of the length of the clear-to-send frame;
   determining, based on the first portion, whether the physical layer convergence protocol data unit includes a second portion transmitted at a higher data rate than the first portion;
   receiving the second portion at the higher data rate based on the determining;
   decoding the second portion to determine scheduling information for a multi-user transmission and to identify one or more devices that communicate during the multi-user transmission, wherein the identification is based on at least one of a station identifier, group identifier, and an association identifier;
   determining if the wireless device is identified;
   decoding the second portion to determine one or more parameters of the multi-user transmission including one or more of a modulation and coding scheme (MCS), bandwidth, sub-band, spatial stream information, and length information for the multi-user transmission; and communicating during the multi-user transmission based on whether the wireless device is identified and based on the determined one or more parameters.

12. The method of claim 11, further comprising:
decoding the first portion for determining a duration field having a data value greater than a combined length of the first and second portions; and
setting a network allocation vector based on the data value of the duration field.

13. The method of claim 11, further comprising:
decoding the first portion to determine a length of the second portion; and
decoding the second portion based on the determined length of the second portion.

14. The method of claim 11, further comprising:
decoding the signal field to determine an end position of the second portion; and
decoding the second portion based on the determined end position of the second portion.

15. An apparatus for receiving a physical layer convergence protocol data unit on a wireless medium, comprising:
a receiver configured to receive a first portion of the physical layer convergence protocol data unit, the first portion including a clear-to-send frame having a signal field, wherein the signal field indicates a length of the physical layer convergence protocol data unit greater than a length of the clear-to-send frame, the indicated length including at least a portion of the length of the clear-to-send frame; and
a processor configured to determine, based on the first portion, whether the physical layer convergence protocol data unit includes a second portion transmitted at a higher data rate than the first portion, wherein the receiver is further configured to receive the second portion at the higher data rate based on the determining, wherein the processor is further configured to:
decode the second portion to determine scheduling information for a multi-user transmission,
decode the second portion to identify one or more devices that will communicate during the multi-user transmission, wherein the identification is based on at least one of a station identifier, group identifier, and association identifier,
determine if the apparatus is identified,
decode the second portion to determine one or more parameters of the multi-user communication including a modulation and coding scheme (MCS), bandwidth, sub-band, spatial stream information, and length information for the multi-user transmission, and
communicate during the multi-user transmission based on whether the apparatus is identified and based on the determined one or more parameters.

16. The apparatus of claim 15, wherein the processor is further configured to identify the one or more devices by decoding one of a station identifier, group identifier, and association identifier for each of the one or more set of devices from the second portion.

17. The apparatus of claim 15, wherein the processor is further configured to:
decode a data value in a duration field in the first portion;
determine if the data value is greater than a combined length of the first and second portions; and
set a network allocation vector in response to the determination.

* * * * *